(12) United States Patent
Mitsutani

(10) Patent No.: US 9,906,129 B2
(45) Date of Patent: Feb. 27, 2018

(54) POWER SUPPLY SYSTEM

(71) Applicant: Toyota Jidosha Kabushiki Kaisha, Toyota-shi Aichi-ken (JP)

(72) Inventor: Noritake Mitsutani, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 354 days.

(21) Appl. No.: 14/750,228

(22) Filed: Jun. 25, 2015

(65) Prior Publication Data
US 2015/0380929 A1 Dec. 31, 2015

(30) Foreign Application Priority Data

Jun. 30, 2014 (JP) ................. 2014-133736

(51) Int. Cl.
| | | |
|---|---|---|
| H02J 1/04 | (2006.01) | |
| H02J 1/12 | (2006.01) | |
| H02M 3/158 | (2006.01) | |
| B60L 1/00 | (2006.01) | |
| B60L 11/18 | (2006.01) | |
| H02J 1/10 | (2006.01) | |

(52) U.S. Cl.
CPC ............... *H02M 3/158* (2013.01); *B60L 1/00* (2013.01); *B60L 11/1868* (2013.01); *H02J 1/04* (2013.01); *H02J 1/12* (2013.01); *B60L 2210/12* (2013.01); *H02J 2001/104* (2013.01); *H02J 2001/106* (2013.01); *Y02T 10/7216* (2013.01)

(58) Field of Classification Search
CPC ...... H02J 1/04; H02J 1/10; H02J 1/102; H02J 1/12; H02J 1/14; H02J 2001/104; H02J 2001/106; H02M 3/158; Y02T 10/7216
USPC ............................................................ 307/52
See application file for complete search history.

(56) References Cited

U.S. PATENT DOCUMENTS

| | | | | |
|---|---|---|---|---|
| 5,488,531 A | * | 1/1996 | Aldridge | H02J 1/10 361/18 |
| 5,583,753 A | * | 12/1996 | Takayama | H02J 1/102 363/65 |
| 7,830,686 B2 | * | 11/2010 | Zeng | H02M 3/285 363/69 |
| 2004/0036294 A1 | * | 2/2004 | Kishibata | H02J 1/102 290/14 |
| 2009/0115374 A1 | * | 5/2009 | Noda | H01M 10/44 320/138 |

(Continued)

FOREIGN PATENT DOCUMENTS

| | | |
|---|---|---|
| JP | 2010-188937 A | 9/2010 |
| JP | 2013-070514 A | 4/2013 |

*Primary Examiner* — Levi Gannon
(74) *Attorney, Agent, or Firm* — Dinsmore & Shohl LLP

(57) ABSTRACT

A power supply system includes a load, a power line, first and second DC power supplies, a power converter, and a controller for controlling the power converter. Upon selection of an operation mode in which the first and second DC power supplies are parallelly connected to the power line for providing the power line with an output from the first DC power supply after DC voltage conversion in the power converter and with an output from the second DC power supply without DC voltage conversion, the controller sets the maximum value of the total power output from the first and second DC power supplies to the power line at the sum of actual power of the first DC power supply and a charge limiting value for the second DC power supply.

9 Claims, 20 Drawing Sheets

(56) References Cited

U.S. PATENT DOCUMENTS

| | | | | |
|---|---|---|---|---|
| 2010/0181829 A1* | 7/2010 | Ichikawa | ............ | B60L 11/1861 |
| | | | | 307/9.1 |
| 2011/0115294 A1* | 5/2011 | Gallegos-Lopez | ..... | H02M 1/10 |
| | | | | 307/52 |
| 2012/0123625 A1* | 5/2012 | Ueo | ........................ | B60L 3/003 |
| | | | | 701/22 |
| 2013/0134786 A1* | 5/2013 | Ishigaki | ................ | H02M 3/158 |
| | | | | 307/71 |
| 2015/0336523 A1* | 11/2015 | Okaniwa | ................ | B60L 11/18 |
| | | | | 307/10.6 |

* cited by examiner

| OPERATION MODE | WORKING POWER SUPPLY | OUTPUT VOLTAGE | S1 | S2 | S3 | S4 |
|---|---|---|---|---|---|---|
| PB | 10a AND 10b (PARALLEL) | VH→VH* | PWM CONTROL | | | |
| SB | 10a AND 10b (SERIES) | VH→VH* | PWM CONTROL | | | |
| aB | ONLY 10a | VH→VH* | PWM CONTROL | | | |
| bB | ONLY 10b | VH→VH* | PWM CONTROL | | | |
| PD | 10a AND 10b | VH=Va=Vb | ON | ON | OFF | ON |
| SD | 10a AND 10b | VH=Va+Vb | ON | OFF | ON | OFF |
| aD | ONLY 10a | VH=Va (Va>Vb) | ON | ON | OFF | OFF |
| bD | ONLY 10b | VH=Vb (Vb>Va) | ON | OFF | OFF | ON |
| PBD | 10a AND 10b (PARALLEL, 10a BOOSTED, 10b DIRECTLY) | VH=Vb (Vb>Va) | ON | PWM CONTROL | | ON |

FIG. 3

| | ARITHMETIC EXPRESSION |
|---|---|
| SG1 | /SDa or /SDb |
| SG2 | /SDa or SDb |
| SG3 | SDa or SDb |
| SG4 | SDa or /SDb |

| | ARITHMETIC EXPRESSION |
|---|---|
| SG1 | /SDc |
| SG2 | SDc |
| SG3 | FIXED TO H |
| SG4 | SDc |

| | ARITHMETIC EXPRESSION |
|---|---|
| SG1 | FIXED TO H |
| SG2 | /SDa |
| SG3 | SDa |
| SG4 | FIXED TO H |

| OPERATION MODE | POWER ALLOCATION RATIO k | VH CONTROLLABLE RANGE |
|---|---|---|
| PB | CONTROLLABLE | $\max(Va, Vb) \sim VHmax$ |
| SB | $\dfrac{Va}{Va+Vb}$ | $Va+Vb \sim VHmax$ |
| aB | 1.0 | $\max(Va, Vb) \sim VHmax$ |
| bB | 0 | $\max(Va, Vb) \sim VHmax$ |
| PD | $\dfrac{Rb}{Ra+Rb}$ | $=Va(=Vb)$ |
| SD | $\dfrac{Va}{Va+Vb}$ | $=Va+Vb$ |
| aD | 1.0 | $=Va$ |
| bD | 0 | $=Vb$ |
| PBD | CONTROLLABLE IN FIXED RANGE | $=Vb(\text{or } Va)$ |

FIG. 14

| VOLTAGE RANGE | VR1 | VR2 | VR3 |
|---|---|---|---|
| APPLICABLE MODE | aD,bD,PD,PBD | aB<br>bB<br>PB<br>SD | PB<br>SB<br>aB<br>bB |

POWER SUPPLY SYSTEM

INFORMATION OF RELATED APPLICATION

This application claims priority to Japanese Patent Application No. 2014-133736 filed on Jun. 30, 2014, the entire disclosure of which is incorporated herein by reference.

TECHNICAL FIELD

The present invention relates to a power supply system composed of a plurality of direct current power supplies, a common power line, and a power converter connected between the power supplies and the power line.

BACKGROUND ART

Conventionally, hybrid vehicles including an engine, two motors, and a controller for centrally controlling the engine and the motors have been known, as disclosed in JP 2010-188937 A. In the hybrid vehicles, two direct current (DC) power supplies are mounted in a state capable of respectively supplying electric power via power converters to the two motors, which are loads. The controller performs voltage control on one of the DC power supplies and power control on the other of the DC power supplies to individually control the power converters such that each motor is supplied with electric power necessary for an output requested of the motor.

It is further described in JP 2010-188937 A that, in the hybrid vehicle, the controller defines an upper limit value of a motor request power as the sum of limiting values associated with the DC power supplies when the engine is cranked by the motors, and defines the upper limit value of the motor request power as the sum of a target power value given to the DC power supply subjected to the power control and an output limit given to the DC power supply subjected to the voltage control when the engine is not cranked.

In the hybrid vehicle described in JP 2010-188937 A, there is a danger that electric power exceeding an output limit may be drawn from the DC power supply on a voltage control side at any time other than the time when the engine is cranked. This can happen in a case where responsivity of the power converter on a power control side is delayed relative to a change in power output request of the motor because such a delayed response results in a temporary shortage of power that should be delivered from the DC power supply on the power control side, and the shortage of power is compensated for by the DC power supply on the voltage control side while exceeding the output limit.

An advantage of the present invention is to appropriately prevent direct current (DC) power supplies from outputting power beyond output limitation in a power supply system equipped with a plurality of DC power supplies, and accordingly suppress progression of deterioration in the DC power supplies.

SUMMARY

A power supply system according to the present invention includes a load, a power line connected to the load, first and second DC power supplies capable of supplying electric power to the load, a power converter connected between the power line and at least one of the first and second DC power supplies, and a controller for controlling operation of the power converter. The power converter includes a plurality of switching elements, and is configured to function in one of a plurality of operation modes which differ from each other in a way of converting power between the power line and the first and second DC power supplies. In the power supply system, upon selection of one operation mode in which the first and second DC power supplies are connected in parallel to the power line to provide an output of the first DC power supply to the power line after the output is converted into a DC voltage by the power converter, and provide an output of the second DC power supply to the power line without DC voltage conversion, the controller sets a maximum value of a total power output from the first and second DC power supplies to the power line to the sum of an actual power of the first DC power supply and a discharge limiting value given to the second DC power supply.

In the power supply system according to another aspect of the present invention, upper and lower limits may be established for the total power supplied from the first and second DC power supplies, to thereby perform a process of correcting a power command value given to the total power when the total power exceeds the upper or lower limit.

In the power supply system according to still another aspect of the present invention, the plurality of switching elements may be switched by on-off control, to perform the DC voltage conversion between the first DC power supply and the power line, and to directly connect the second DC power supply to the power line in the selected one operation mode.

In this case, the second DC power supply may be connected via a current path including a predetermined one of the plurality of switching elements to the power line, and, in the selected one operation mode, the second DC power supply may be directly connected to the power line by fixing the predetermined switching element to an ON state.

Further, in the above case, a first power converter including a plurality of switching elements may be connected between the first DC power supply and the power line, and a second power converter including other plurality of switching elements different from those in the first power converter may be connected between the second DC power supply and the power line. Then, in the selected one operation mode, the DC voltage conversion is performed between the first DC power supply and the power line by controlling ON or OFF states of the switching elements in the first power converter, while the second DC power supply is connected directly to the power line by fixing at least one of the switching elements in the second power converter to the ON state.

Advantageous Effect of the Invention

According to the power supply system of this invention, the DC power supply on the voltage control side can be prevented from outputting power that exceeds the output limit, to thereby suppress progression of deterioration in the DC power supply.

BRIEF DESCRIPTION OF THE DRAWINGS

The present invention will be further described with reference to the accompanying drawings, wherein like reference numerals refer to like parts in the several views, and wherein:

FIG. 3 is a chart for explaining a plurality of different operation modes carried out by a power converter depicted in FIG. 1;

FIG. 14 is a chart showing a comparison of the operation modes depicted in FIG. 3 with respect to controllability of a power allocation ratio between the DC power supplies and a programmable range of output voltages;

DESCRIPTION OF THE EMBODIMENT

In the following, an embodiment of the present invention will be described with reference to the drawings. In the description below, specific shapes, materials, numerical values, directions, orientations, and other features are indicated by way of example for better understanding of the present invention, and may be changed as appropriate depending on applications, purposes, technical specifications, and the like. It is to be understood if and when a plurality of embodiments and modifications thereof are described in the description below, combined use of characteristic features in the embodiments and modifications is originally envisaged.

Figure 1:
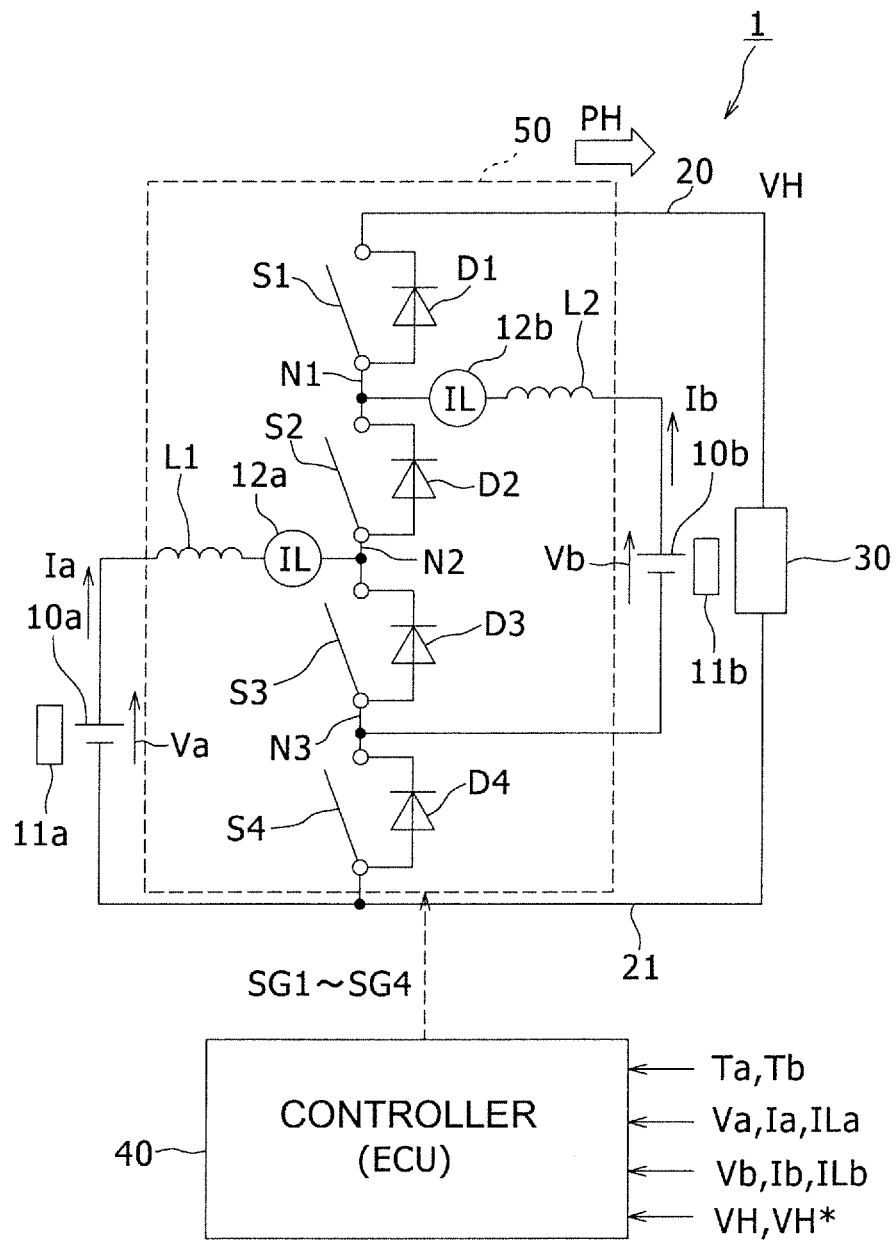
FIG. 1 shows a configuration of a power supply system according to an embodiment of the present invention.

FIG. 1 is a circuit diagram showing a configuration of a power supply system according to an embodiment of this invention. The power supply system 1 includes a first DC power supply 10a, a second DC power supply 10b, a load 30, a controller 40, and a power converter 50.

In this embodiment, each DC power supply 10a, 10b is composed of a secondary battery such as a lithium ion battery or a nickel metal hydride battery, or a DC voltage generator element such as an electric double layered capacitor or a lithium ion capacitor, which has superior output characteristics. It should be noted that the DC power supply 10a corresponds to the "first DC power supply," and the DC power supply 10b corresponds to the "second DC power supply" described in the summary.

The DC power supplies 10a, 10b may be composed of DC power supplies of the same type having the same capacitance, or may be composed of DC power supplies having different characteristics and/or capacitances.

The power converter 50 is connected between the DC power supplies 10a, 10b and a power line 20. The power converter 50 controls a DC voltage (hereinafter also referred to as an output voltage VH) on the power line 20 connected to the load 30 in accordance with a voltage command value VH*. That is, the power line 20 is shared by the DC power supplies 10a and 10b.

The load 30 is operated by receiving the output voltage VH from the power converter 50. The voltage command value VH* is set at a voltage suitable for operation of the load 30. The voltage command value VH* is variably defined depending on operating states (such as, for example, a torque, the number of revolutions) of the load 30. Further, the load 30 may be configured to be capable of generating electric power to charge the DC power supplies 10a, 10b through regenerative power generation or the like.

The power converter 50 includes switching elements S1 to S4 and reactors L1, L2. In this embodiment, for example, an IGBT (Insulated Gate Bipolar Transistor) or the like may be used for the switching elements S1 to S4. The switching elements S1 to S4 are antiparallelly connected to diodes D1 to D4.

The switching elements S1 to S4 may be respectively controlled to be turned on or off in response to control signals SG1 to SG4. Specifically, the switching elements S1 to S4 are respectively turned on when the control signals SG1 to SG4 are at High levels (hereinafter referred to as H levels), and respectively turned off when the control signals SG1 to SG4 are at Low levels (hereinafter referred to as L levels).

The switching element S1 is electrically connected between the power line 20 and a node N1. The reactor L2 is connected between the node N1 and a positive terminal of the DC power supply 10b. A current ILb flowing through the reactor L2 is detected by a current sensor 12b and input into the controller 40. The switching element S2 is electrically connected between the node N1 and a node N2. The reactor L1 is connected between the node N2 and a positive terminal of the DC power supply 10a. A current ILa flowing through the reactor L1 is detected by a current sensor 12a and input into the controller 40.

The switching element S3 is electrically connected between the node N2 and a node N3. The node N3 is electrically connected to a negative terminal of the DC power supply 10b. The switching element S4 is electrically connected between the node N3 and a grounding line 21. The grounding line 21 is electrically connected to the load 30 and the negative terminal of the DC power supply 10a.

As can be seen from FIG. 1, the power converter 50 includes boosting chopper circuits respectively intended for the DC power supplies 10a and 10b. In other words, a DC bidirectional first boosting chopper circuit is formed for the DC power supply 10a by taking the switching elements S1, S2 as an upper arm element of the first chopper circuit and taking the switching elements S3, S4 as a lower arm element of the first chopper circuit. Similarly, a DC bidirectional second boosting chopper circuit is formed for the DC power supply 10b by taking the switching elements S1, S4 as the upper arm element of the second chopper circuit and taking the switching elements S2, S3 as the lower arm element of the second chopper circuit.

Then, the switching elements S1 to S4 are contained in both a power conversion path which is formed between the DC power supply 10a and the power line 20 by the first boosting chopper circuit and a power conversion path which is formed between the DC power supply 10b and the power line 20 by the second boosting chopper circuit. It should be noted that in the structure of FIG. 1, the switching elements S1 to S4 correspond to "a plurality of switching elements" in the power converter 50.

The controller 40 generates control signals SG1 to SG4 that controls on and off of the switching elements S1 to S4 to control the output voltage VH supplied to the load 30. The controller 40 receives inputs of a voltage Va of the DC power supply 10a detected by a voltage sensor 11a, a current Ia passing through the DC power supply 10a and detected by a not-illustrated current sensor, a voltage Vb of the DC power supply 10b detected by a voltage sensor 11b, and a current Ib of the DC power supply 10b detected by a not-illustrated current sensor. Further, the controller 40 also receives inputs of temperatures Ta, Tb of the DC power supplies 10a, 10b respectively detected by non-illustrated temperature sensors. Still further, the controller 40 receives the output voltage VH of the power converter 50 detected by a non-illustrated voltage sensor.

It should be noted that when no power distribution line for an auxiliary machine is connected between the DC power supply 10a and the reactor L1, the current ILa flowing through the reactor L1 is assumed to be equal to the current Ia of the DC power supply 10a. Similarly, when no power distribution line for the auxiliary machine is connected between the DC power supply 10b and the reactor L2, the current ILb flowing through the reactor L2 is assumed to be equal to the current Ib of the DC power supply 10b.

Figure 2:
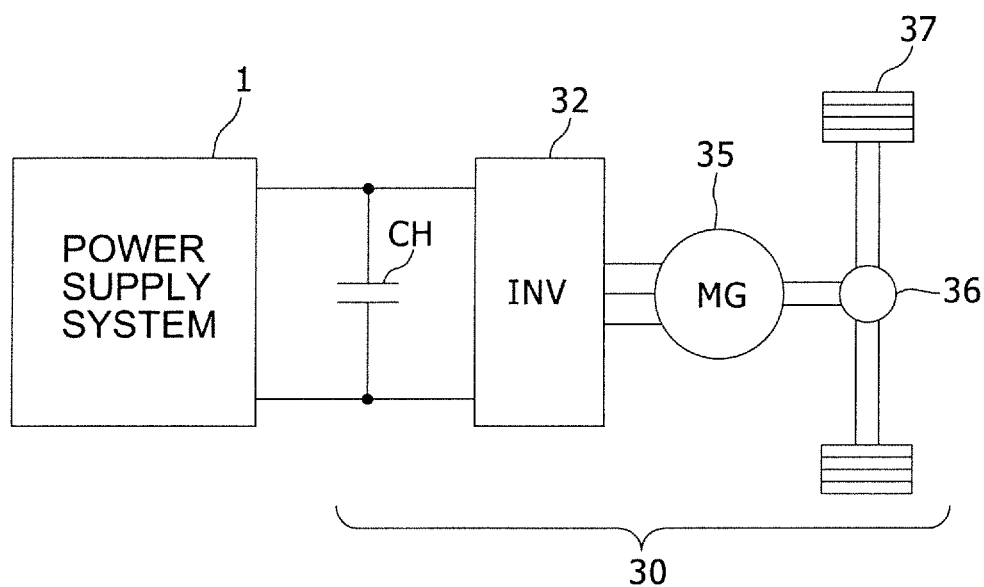
FIG. 2 is a schematic diagram showing an exemplary structure of a load depicted in FIG. 1.

FIG. 2 is a schematic diagram showing an exemplary structure of the load 30. The load 30 is configured to include a drive motor for an electric vehicle, for example. The load 30 includes a smoothing capacitor CH, an inverter 32, a motor generator 35, a power transmission gear 36, and drive wheels 37.

The motor generator 35 is a drive motor for generating a vehicle driving force, and may be composed of, for example, a permanent magnet synchronous motor having multiple phases. A torque output from the motor generator 35 is transmitted to the drive wheels 37 via the power transmission gear 36 composed of reduction gears and a power dividing mechanism. The torque transmitted to the drive wheels 37 causes the electric vehicle to travel. Meanwhile, the motor generator 35 generates electric power by means of a rotating force of the drive wheels 37 when the electric vehicle is in a regenerative braking mode. The generated electric power is converted from alternating current (AC) power into DC power by the inverter 32 and may be used as electric power to be charged to the DC power supplies 10a, 10b contained in the power supply system 1.

In the hybrid vehicle equipped with an engine (not illustrated) in addition to the motor generator 35, the engine and the motor generator 35 may be cooperatively driven to generate the vehicle driving force necessary for the electric vehicle. Also in this case, it is possible to charge the DC power supplies 10a, 10b with electric power generated by revolution of the engine.

As such, the electric vehicle comprehensively refers to vehicles equipped with the drive motor, and may include both hybrid vehicles that generate the vehicle driving force by means of the engine and the motor and vehicles unequipped with the engine, such as electric vehicles and fuel cell vehicles.

<Operation Mode of Power Converter>

The power converter 50 has a plurality of operation modes that differ in a way of converting DC power between the DC power supplies 10a, 10b and the power line 20.

FIG. 3 shows the plurality of operation modes owned by the power converter 50. As shown in FIG. 3, the operation modes are broadly grouped under a "boosting (B) mode" for boosting the output voltage of the DC power supplies 10a and/or 10b in response to periodic on-off control of the switching elements S1 to S4 and a "direct connection (D) mode" for establishing direct electrical connection of the DC power supplies/supply 10a and/or 10b to the power line 20 by fixing the switching elements S1 to S4 to ON or OFF states.

The boosting mode includes a "parallel boosting mode (hereinafter referred to as 'PB mode')" for performing DC/DC conversion in parallel between the power line 20 and the DC power supply 10a and between the power line 20 and the DC power supply 10b, a "series boosting mode (hereinafter referred to as 'SB mode')" for performing the DC/DC conversion between the power line 20 and the serially connected DC power supplies 10a, 10b, and a "parallel boosting direct connection mode (hereinafter referred to as a 'PBD mode')" for performing the DC/DC conversion between the power line 20 and one of the DC power supplies 10a, 10b while directly connecting the other of the DC power supplies 10a, 10b to the power line 20 in parallel with the one of the DC power supplies 10a, 10b. It should be noted that because the PDB mode is an operation mode accompanying boosting operation performed on one of the DC power supplies 10a, 10b, the PBD mode will be categorized as the "boosting (B) mode" rather than the "direct (D) connection mode" in the description below.

The boosting mode further includes a "solo DC power supply 10a mode (hereinafter referred to as an 'aB mode')" for performing the DC/DC conversion exclusively between the DC power supply 10a and the power line 20 and a "solo DC power supply 10b mode (hereinafter referred to as a 'bB mode')" for performing the DC/DC conversion exclusively between the DC power supply 10b and the power line 20. In the aB mode, as long as the output voltage VH is maintained higher than the voltage of the DC power supply 10b, the DC power supply 10b is kept in a condition electrically isolated from the power line 20 and accordingly disabled. Similarly, as long as the output voltage VH is maintained higher than the voltage of the DC power supply 10a in the bB mode, the DC power supply 10a is kept in a condition electrically isolated from the power line 20 and accordingly disabled.

In each of the PB, SB, aB, and bB modes grouped under the boosting mode, the output voltage VH on the power line 20 is controlled based on the voltage command value VH*. Operation to control the switching elements S1 to S4 in those modes will be described in detail below.

Meanwhile, the direct connection mode includes a "parallel direct connection mode (hereinafter referred to as a 'PD mode')" for maintaining the DC power supplies 10a, 10b in a condition parallelly connected to the power line 20, and a "series direct connection mode (hereinafter referred to as a 'SD mode')" for maintaining the DC power supplies 10a, 10b in a condition serially connected to the power line 20.

In the PD mode, the switching elements S1, S2 and S4 are fixed to an ON state while the switching element S3 is fixed to an OFF state. In this way, the output voltage VH becomes equal to the output voltages Va, Vb of the DC power supplies 10a, 10b (in a precise sense, equal to the higher one of the output voltages Va, Vb). Because a difference between voltages Va and Vb causes a short circuit current to flow between the DC power supplies 10a and 10b, the PD mode may be applied only when the difference between the voltages Va and Vb is small.

In the SD mode, the switching elements S2, S4 are fixed to the OFF state, while the switching elements S1, S3 are fixed to the ON state. In this way, the output voltage VH becomes equal to the sum of the output voltages Va and Vb of the DC power supplies 10a and 10b (VH=Va+Vb).

The direct connection mode further includes a "DC power supply 10a direct connection mode (hereinafter referred to as an 'aD mode')" for electrically connecting only the DC power supply 10a to the power line 20, and a "DC power supply 10b direct connection mode (hereinafter referred to as a 'bD mode')" for electrically connecting only the DC power supply 10b to the power line 20.

In the aD mode, the switching elements S1, S2 are fixed to the ON state, while the switching elements S3, S4 are fixed to the OFF state. In this way, the DC power supply 10b is disconnected from the power line 20, thereby making the output voltage VH equal to the voltage Va of the DC power supply 10a (VH=Va). In the aD mode, the DC power supply 10b is maintained in the condition electrically isolated from the power line 20 and accordingly disabled. Here, the aD mode applied under a condition where Vb>Va causes a short circuit current to flow from the DC power supply 10b to the DC power supply 10a via the switching element S2. To prevent the short circuit current, a condition where Va>Vb is a prerequisite for application of the aD mode.

Similarly, in the bD mode the switching elements S1, S4 are fixed to the ON state, while the switching elements S2, S3 are fixed to the OFF state. This isolates the DC power supply 10a from the power line 20, and therefore makes the output voltage VH equal to the voltage Vb of the DC power supply 10b (VH=Vb). In the bD mode, the DC power supply 10a is maintained in the condition electrically isolated from the power line 20, and accordingly disabled. Here, the bD mode applied under the condition where Va>Vb causes a short circuit current to flow from the DC power supply 10a to the DC power supply 10b via the diode D2. To prevent this, the condition where Vb>Va is a prerequisite for application of the bD mode.

In each of the PD, SD, aD, and bD modes belonging to the direct connection mode, because the output voltage VH on the power line 20 is determined depending on the voltages Va, Vb of the DC power supplies 10a, 10b, it is not possible to directly control the output voltage VH. For this reason, the output voltage VH cannot be set to a voltage suitable for operation of the load 30 in each direct connection mode, which raises a possibility that a power loss in the load 30 is increased.

On the other hand, a power loss in the power converter 50 is greatly decreased in the direct connection mode, because the switching elements S1 to S4 are not frequently turned on and off. This raises another possibility that, depending on the operating state of the load 30, a total power loss in the entire power supply system 1 can be reduced by application of the direct connection mode in such a manner that a decreased portion of the power loss in the power converter 50 becomes greater than an increased portion of the power loss in the load 30.

The above-described condition is similarly applied to the PBD mode, which is a distinctive operation mode in this embodiment. More specifically, in the PBD mode, because one of the DC power supplies 10a and 10b is connected, directly and in parallel with the other of the DC power supplies 10a and 10b, to the power line 20, the output voltage VH becomes equal to the voltage Va or Vb of the DC power supply 10a or 10b, and cannot be controlled in a direct way. However, among the switching elements S1 to S4, two switching elements associated with the DC power supply 10a or 10b directly connected to the power line 20 are not turned on or off, which leads to a great decrease of the power loss in the power converter 50. Thus, the PBD mode also raises the possibility that the total power loss in the entire power supply system 1 can be reduced depending on the operating state of the load 30.

In FIG. 3, the PB, SB, aB, bB, PD, SD, aD, and bD modes correspond to the "plurality of operation modes," and the PBD mode corresponds to the "selected one operation mode" described in the Summary.

In the power supply system 1 of this embodiment, it is preferable that the DC power supply 10a is of a high output type while the DC power supply 10b is of a high capacity type. In this way, when rapid acceleration is requested, for example, through accelerator operation by a user in the electric vehicle, the output from the DC power supply 10a of the high output type may be used to process the request. On the other hand, when relatively low power is required over a long time period for continuous high-speed, steady travel or the like in the electric vehicle, the output from the DC power supply 10b of the high capacity type may be used to fulfill the requirement. In the electric vehicle as described above, electric energy stored in the DC power supply 10b of the high capacity type can be used for the long time period, to thereby extend a travel distance using the electric energy, while, on the other hand, swift acceleration performance for responding to the accelerator operation by the user can be also secured.

However, in a case where the DC power supplies are composed of batteries, their output characteristics can possibly be deteriorated under low temperature conditions, and their charge/discharge operation can possibly be restricted in order to prevent deterioration of the batteries from progressing under high temperature conditions. Particularly, in the electric vehicle, a temperature difference may be created in some cases between the DC power supplies 10a and 10b by their different mounting positions. Considering such cases, while charge and discharge operation of each DC power supply 10a, 10b is restricted, a process is performed in the power supply system 1 to limit the output power PH that is output to the power line 20 in response to a power request from the load 30, to thereby protect the DC power supplies 10a, 10b from being overdischarged or overcharged beyond the limiting values. Details of the process will be described below.

<Boosting Operation in PB Mode>

Figure 4A:
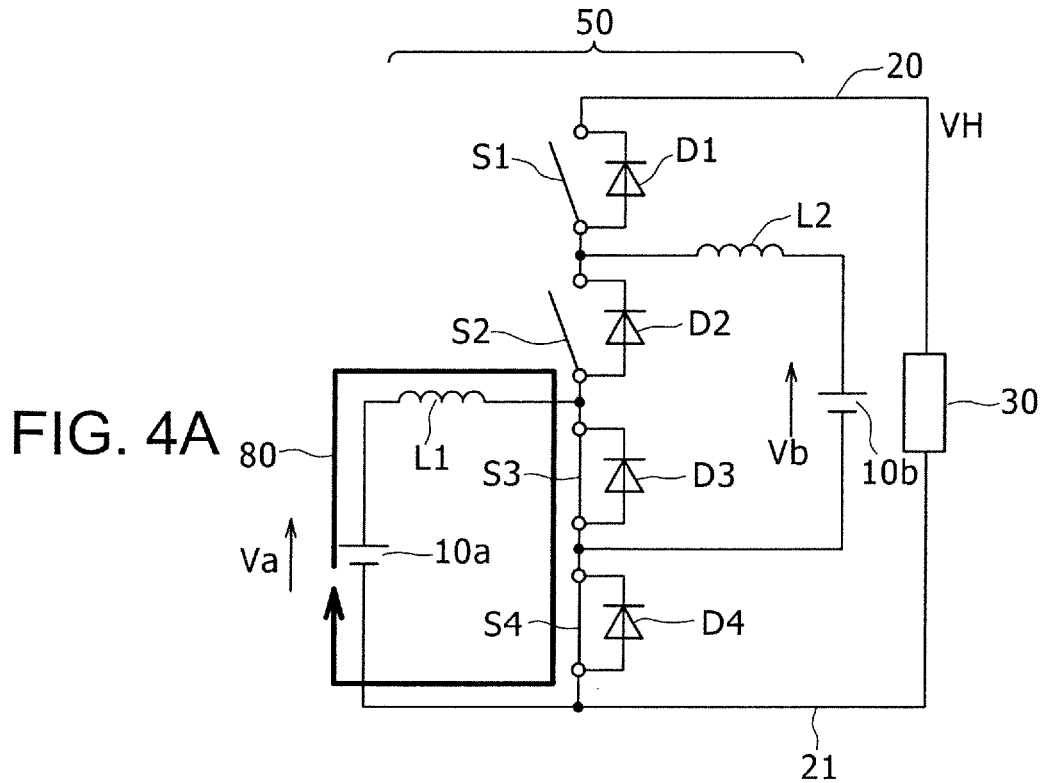
FIG. 4A is a circuit diagram for explaining DC-DC conversion (boosting operation) performed on a first DC power supply in a PB mode.
Figure 4B:
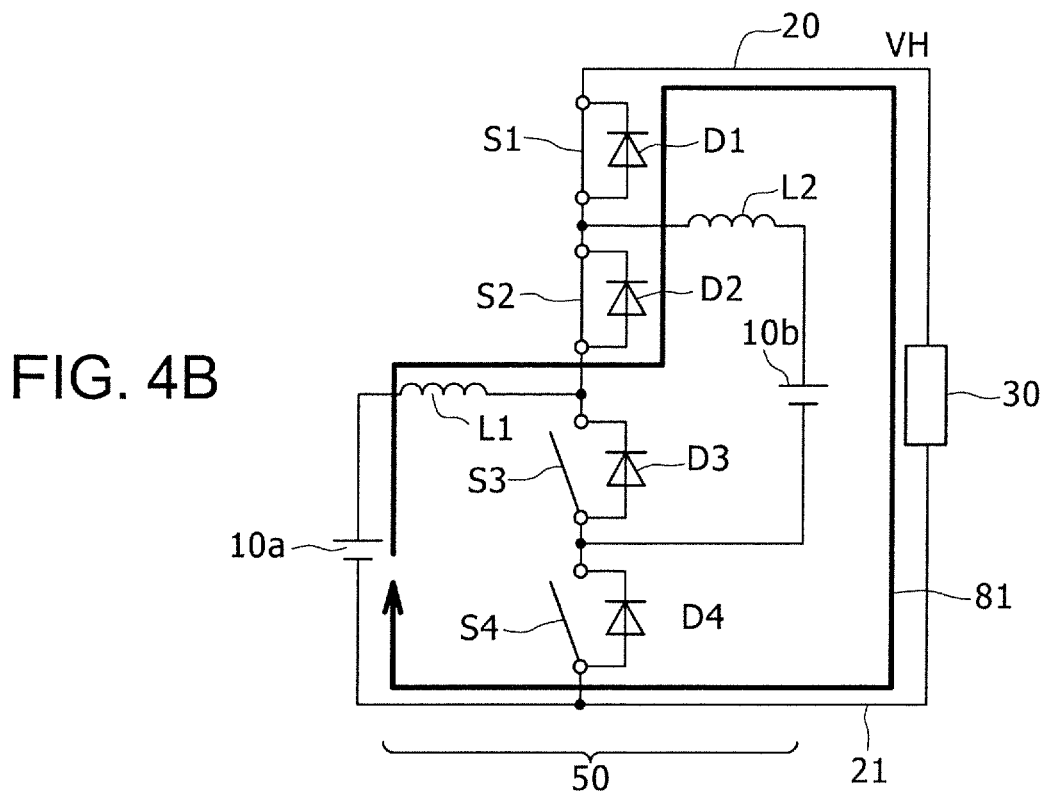
FIG. 4B is a circuit diagram for explaining DC-DC conversion (boosting operation) performed on the first DC power supply in the PB mode.

Next, boosting operation in the PB mode will be described in detail with reference to FIGS. 4A, 4B and 5. FIGS. 4A, 4B show DC/DC conversion (boosting operation) performed on the DC power supply 10a in the PB mode. As shown in FIG. 4A, the pair of the switching elements S3, S4 is turned on while the pair of the switching elements S1, S2 is turned off, to thereby form a current path 80 for storing energy in the reactor L1. This establishes a state where the lower arm element of the boosting chopper circuit is turned on.

On the other hand, as shown in FIG. 4B, the pair of the switching elements S3, S4 is turned off while the pair of the switching elements S1, S2 is turned on, which forms a current path 81 for outputting the energy stored in the reactor L1 along with energy of the DC power supply 10a. This establishes a state where the upper arm element of the boosting chopper circuit is turned on. In this state, because a current flows through the diodes D1, D2 in the current path 81, the switching elements S1, S2 function as a switch to form a current path through which regenerative power from the load 30 is charged to the DC power supply 10a.

As described above, a first period in which the pair of the switching elements S3, S4 is turned on while at least one of the switching elements S1, S2 is turned off and a second period in which the pair of the switching elements S1, S2 is turned on while at least one of the pair of the switching elements S3, S4 is turned off are alternately repeated, to thereby form the boosting chopper circuit for the DC power supply 10a. Here, in the DC/DC conversion operation shown in FIGS. 4A, 4B, the DC power supplies 10a and 10b do not interfere with each other, due to the absence of a current flow path to the DC power supply 10b. In other words, inputs/outputs of power to/from the DC power supplies 10a and 10b can be independently controlled.

In the above-described DC/DC conversion, a relationship expressed by below-described equation (1) is established between the voltage Va of the DC power supply 10a and the output voltage VH on the power line 20. In equation (1), Da represents a duty ratio of a time period in which the pair of the switching elements S3, S4 is turned on.

$$VH = 1/(1-Da) \cdot Va \quad (1)$$

Figure 5A:
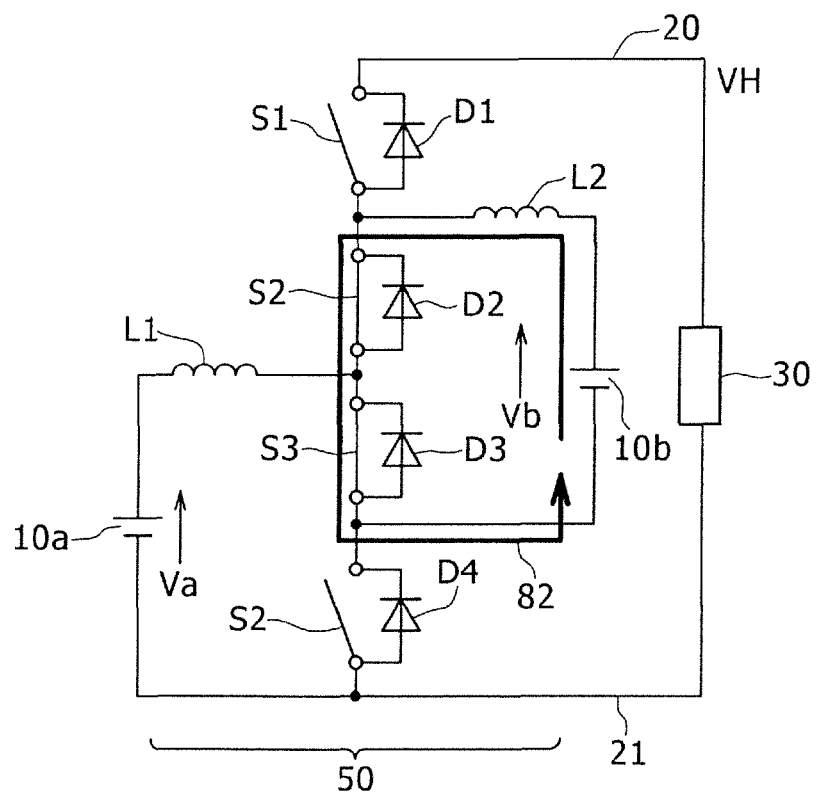
FIG. 5A is a circuit diagram for explaining DC-DC conversion (boosting operation) performed on a second DC power supply in the PB mode.
Figure 5B:
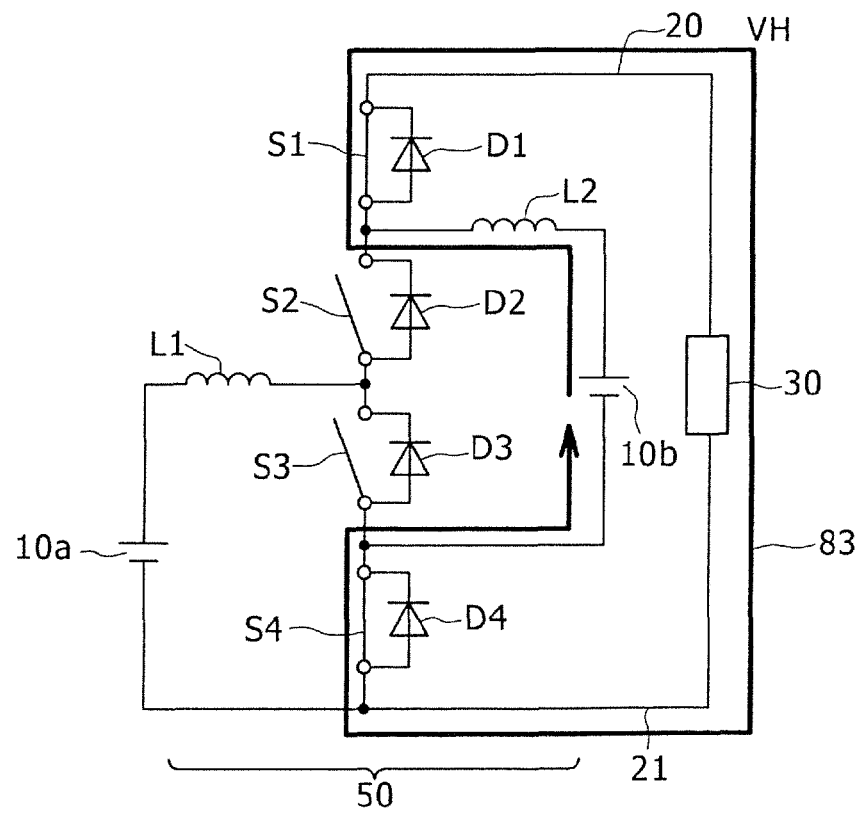
FIG. 5B is a circuit diagram for explaining DC-DC conversion (boosting operation) performed on the second DC power supply in the PB mode.

FIGS. 5A, 5B show DC/DC conversion (boosting operation) for the DC power supply 10b in the PB mode. As shown in FIG. 5A, the pair of the switching elements S2, S3 is turned on while the pair of the switching elements S1, S4 is turned off, which forms a current path 82 for storing energy in the reactor L2. This creates a state where the lower arm element of the boosting chopper circuit is turned on.

On the other hand, as shown in FIG. 5B, a current path 83 for outputting the energy stored in the reactor L2 together with the energy of the DC power supply 10b is formed by switching off the pair of the switching elements S2, S3 while switching on the pair of the switching elements S1, S4. This creates a state where the upper arm element of the boosting chopper circuit is turned on. In the state, because the current flows through the diode D1 in the current path 83, the switching element S1 functions as a switch for forming a current path through which the regenerative power from the load 30 is charged to the DC power supply 10b.

The first period in which the pair of the switching elements S2, S3 is turned on while at least one of the pair of the switching elements S1, S4 is turned off and the second period in which the pair of the switching elements S1, S4 is turned on while at least one of the pair of the switching elements S2 and S3 is turned off are alternately repeated, to thereby form the boosting chopper circuit for the DC power supply 10b. Here, in the DC/DC conversion operation shown in FIGS. 5A, 5B, the absence of a current flow path to the DC power supply 10a prevents the DC power supplies 10a and 10b from interfering with each other. In other words, inputs/outputs of power to/from the DC power supplies 10a and 10b can be independently controlled.

In the DC/DC conversion as described above, a relationship expressed by below-described equation (2) is established between the voltage Vb of the DC power supply 10b and the output voltage VH on the power line 20. In equation (2), Db represents a duty ratio of the time period in which the switching elements S2, S3 are turned on.

$$VH = 1/(1-Db) \cdot VB \quad (2)$$

Figures 6, 7:
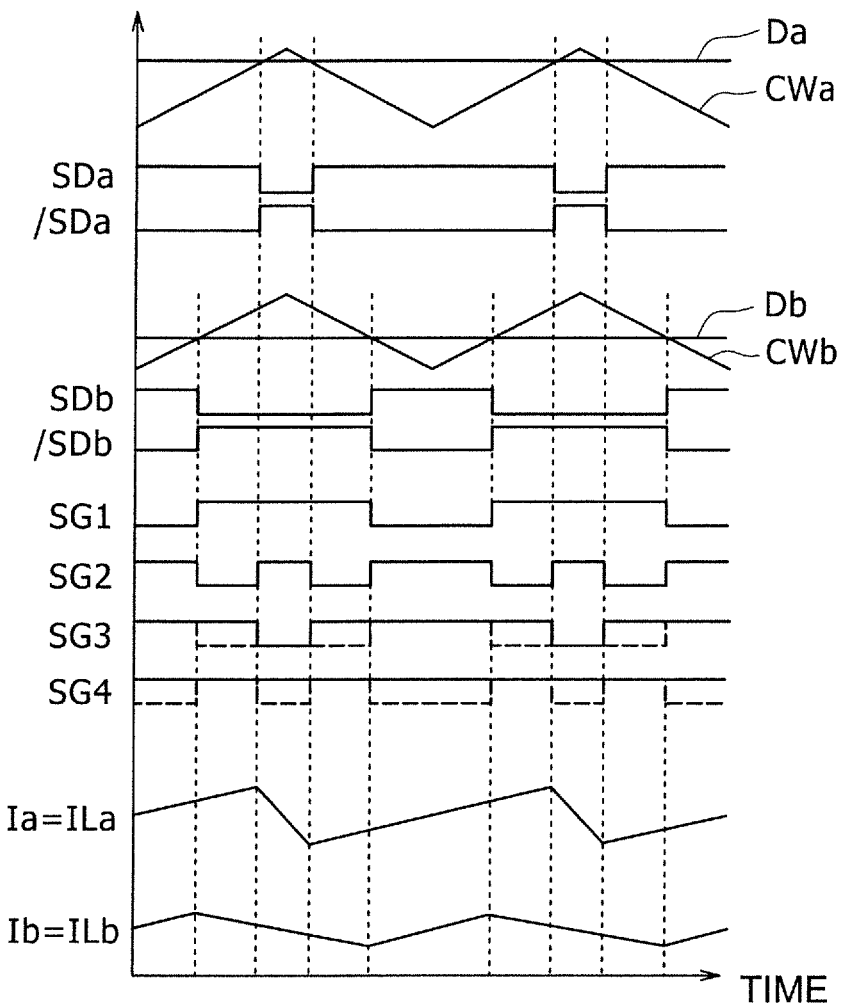
FIG. 6 is a waveform diagram depicting exemplary operation to control switching elements of the power converter in the PB mode.
FIG. 7 is a chart for explaining logical expressions used for setting a signal to control each switching element in the PB mode.

FIG. 6 shows a waveform diagram for explaining an example of operation to control the switching elements S1 to S4 in the PB mode. In FIG. 6, the example is illustrated assuming that a carrier wave CWa used for performing Pulse Width Modulation (PWM) control on the DC power supply 10a and a carrier wave CWb used for performing the PWM control on the DC power supply 10b have the same frequency and the same phase.

Referring to FIG. 6, in the PB mode, for example, an output of one of the DC power supplies 10a, 10b can be controlled so as to compensate for a voltage deviation ΔVH in the output voltage VH (ΔVH=VH*−VH) (voltage control), while an output of the other of the DC power supplies 10a, 10b can be controlled so as to compensate for a current deviation in the currents Ia, Ib (current control). Here, a command value (Ia* or Ib*) for controlling a current of a DC power supply may be defined such that a power output from the DC power supply is controlled.

In one example, when the output of the DC power supply 10b is controlled with respect to its voltage while, on the other hand, the output of the DC power supply 10a is controlled with respect to its current, the duty ratio Da is calculated based on the current deviation ΔIa (ΔIa=Ia*−Ia) while the duty ratio Db is calculated based on the voltage deviation ΔVH.

A control pulse signal SDa is generated based on a voltage comparison between the duty ratio Da for controlling the output of the DC power supply 10a and the carrier wave CWa. Concurrently with this generation, a control pulse signal SDb is generated based on a comparison between the duty ratio Db for controlling the output of the DC power supply 10b and the carrier wave CWb. Control pulse signals /SDa and /SDb shown in FIG. 7 are signals inverted from the control pulse signals SDa and SDb, respectively.

As shown in FIG. 7, the control signals SG1 to SG4 are determined based on a logical operation using the control pulse signals SDa (/SDa) and SDb (/SDb). Specifically, the switching element S1 functions as the upper arm element in each of the boosting chopper circuits illustrated in FIGS. 4A, 4B and 5A, 5B. Therefore, the control signal SG1 for controlling on and off of the switching element S1 is generated by a logical sum of the control pulse signals /SDa and /SDb.

The switching element S2 functions as the upper arm element in the boosting chopper circuit of FIGS. 4A, 4B and functions as the lower arm element in the boosting chopper circuit of FIGS. 5A, 5B. Therefore, the control signal SG2 for controlling on and off of the switching element S2 is generated by a logical sum of the control pulse signals /SDa and SDb.

The switching element S3 functions as the lower arm element in each of the boosting chopper circuits of FIGS. 4A, 4B and 5A, 5B. Therefore, the control signal SG3 for controlling on and off of the switching element S3 is generated by a logical sum of the control pulse signals SDa and SDb.

The switching element S4 functions as the lower arm element in the boosting chopper circuit of FIGS. 4A, 4B and functions as the upper arm element in the boosting chopper circuit of FIGS. 5A, 5B. Therefore, the control signal SG4 for controlling on and off of the switching element S4 is generated by a logical sum of the control pulse signals SDa and /SDb.

As is evident from FIGS. 6 and 7, because the control signals SG2 and SG4 are set at complementary levels in the PB mode, the switching elements S2 and S4 are complementarily turned on or off. Further, due to complementary levels defined to the control signals SG1 and SG3, the switching elements S1 and S3 are complementarily turned on or off. In this way, DC conversion operation can be performed on the DC power supplies 10a, 10b based on the duty ratios Da, Db.

Referring to FIG. 6 again, the current ILa flowing through the reactor L1 and the current ILb flowing through the reactor L2 are controlled by turning on or off the switching elements S1 to S4 in response to the control signals SG1 to SG4. In this example, the current ILa is equivalent to the current Ia of the DC power supply 10a and the current ILb is equivalent to the current Ib of the DC power supply 10b.

In the PB mode, after the DC/DC conversion for inputting/outputting DC power in parallel between the power line 20 and the DC power supplies 10a, 10b is performed, the output voltage VH can be controlled so as to match the voltage command value VH*. Further, the input/output power of the DC power supply subjected to the current control can be controlled based on the current command value defined for the current-controlled DC power supply.

In the PB mode, a shortage of an output power from the current-controlled DC power supply relative to the input/output power (hereinafter also referred to as a "load power PL") to/from the load 30 is to be supplied with the output from a voltage-controlled DC power supply. Therefore, it is intended that a power allocation ratio between the DC power supplies can be indirectly controlled by means of a setting of the current command value for controlling the current. Consequently, it becomes possible to control a way of allocating a total power PH (PH=Pa+Pb), which is input to/output from the power line 20 as a whole from/to the DC power supplies 10a and 10b, to the DC power supplies 10a and 10b. Further, the setting of the current command value may be used to activate operation for charging one of the DC power supplies with the output power from the other of the DC power supplies. It should be noted that the output power Pa, Pb, the total power PH, and the load power PL are hereinafter expressed with positive values when the DC power supplies 10a, 10b are discharged and the load 30 is in power running action, and with negative values when the DC power supplies 10a, 10b are charged and the load 30 is in regenerative action.

<Boosting Operation in aB and bB Modes>

In the aB mode, boosting operation for the DC power supply 10a is the same as that described for the PB mode. Namely, the switching operations shown in FIGS. 4A and 4B are alternately repeated at the duty ratio Da, to thereby perform bidirectional DC/DC conversion (boosting operation) between the DC power supply 10a and the power line 20. When the aB mode is applied, the output power VH to the power line 20 (i.e. the voltage command value VH*) may be set to a voltage substantially equal to the voltage Vb of the DC power supply 10b, to thereby suppress input/output operation of the DC power supply 10b and consequently disable the DC power supply 10b.

On the other hand, in the bB mode, boosting operation for the DC power supply 10b is the same as that described for the PB mode. Namely, switching operations shown in FIGS. 5A and 5B are alternately repeated at a duty ratio Db, to thereby perform bidirectional DC/DC conversion (boosting operation) between the DC power supply 10b and the power line 20. When the bB mode is applied, the output power VH to the power line 20 (i.e. the voltage command value VH*) may be set to a voltage substantially equal to the voltage Va of the DC power supply 10a, to thereby suppress input/output operation of the DC power supply 10a and consequently disable the DC power supply 10a.

<Boosting Operation in SB Mode>

Figure 8A:
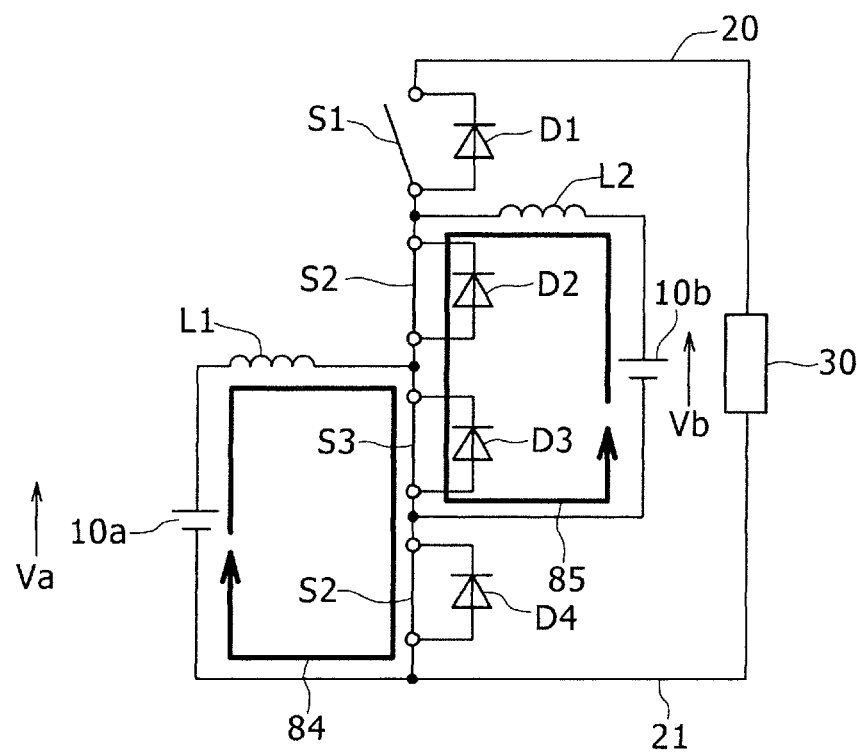
FIG. 8A is a circuit diagram for explaining DC-DC conversion (boosting operation) in an SB mode.
Figure 8B:
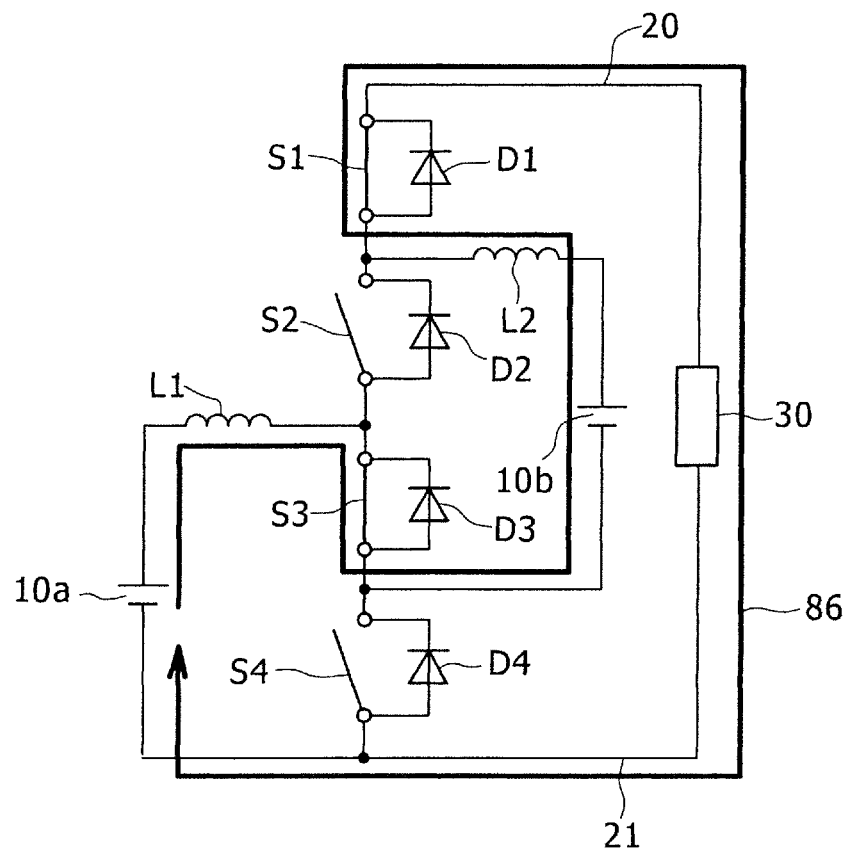
FIG. 8B is a circuit diagram for explaining DC-DC conversion (boosting operation) in the SB mode.

Referring next to FIGS. 8A, 8B, boosting operation in the SB mode will be described. In the SB mode, the switching element S3 is fixed to the ON state for connecting the DC power supplies 10a, 10b in series as shown in FIG. 8A, while the pair of switching elements S2, S4 is turned on and the switching element S1 is turned off. In this way, current paths 84, 85 for storing energy in the reactors L1, L2 are established. In this way, the state where the lower arm element of the boosting chopper circuit is turned on is obtained for the serially-connected DC power supplies 10a, 10b.

On the other hand, as shown in FIG. 8B, while the switching element S3 is maintained in the ON state, the pair of the switching elements S2, S4 is turned off and the switching element S1 is turned on as opposed to the state in FIG. 8A. In this way, the state where the upper arm element of the boosting chopper circuit is turned on is obtained for the serially-connected DC power supplies 10a, 10b. Consequently, the sum of the energy from the serially-connected DC power supplies 10a, 10b and the energy stored in the reactors L1, L2 is output through a current path 86 to the power line 20.

Under a condition where the switching element S3 is fixed to the ON state, a first period in which the pair of the switching elements S2, S4 is turned on while the switching element S1 is turned off and a second period in which the switching element S1 is turned on while the switching elements S2, S4 are turned off are alternately repeated, to thereby form the current paths 84, 85 in FIG. 8A and the current path 86 in FIG. 8B in an alternating manner.

In the DC/DC conversion of the SB mode, a relationship expressed by equation (3) described below is established among the voltage Va of the DC power supply 10a, the voltage Vb of the DC power supply 10b, and the output voltage VH on the power line 20. In equation (3), Dc represents a duty ratio in the first period with the switching elements S2, S4 turned on.

$$VH = 1/(1-Dc) \cdot (Va+Vb) \quad (3)$$

Figures 9, 10:
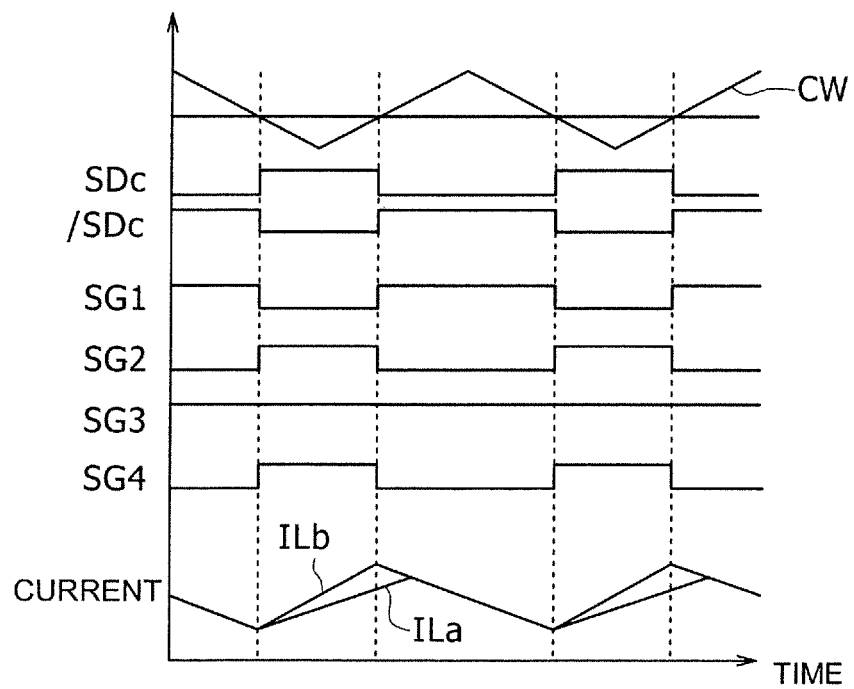
FIG. 9 is a waveform diagram showing exemplary operation of controlling the switching elements in the SB mode.
FIG. 10 is a chart for explaining logical expressions used for setting operation to control the switching elements in the SB mode.

FIG. 9 shows a waveform diagram for explaining an example of operation to control the switching elements S1 to S4 in the SB mode. In the SB mode, the duty ratio Dc contained in equation (3) is calculated in such a manner that the voltage deviation ΔVH in the output voltage VH relative to the voltage command value VH* (ΔVH=HV*−VH) is compensated for. Then, a control pulse signal SDc is generated based on a voltage comparison between the carrier wave CW and the duty ratio Dc. The control pulse signal /SDc is a signal inverted from the control pulse signal SDc. In the SB mode, DC/DC conversion between the DC voltage (Va+Vb) and the output voltage VH is performed by the boosting chopper circuit shown in FIGS. 8A, 8B.

As shown in FIG. 10, the control signal SG3 is fixed to an H level in order to fix the switching element S3 to the ON state as described above. On the other hand, the control signals SG1, SG2, and SG4 may be established based on the control pulse signals SDc and /SDc. The control pulse signal SDc is defined as the control signals SG2, SG4 to control the pair of the switching elements S2, S4 constituting the lower arm element of the boosting chopper circuit. Similarly, the control signal SG1 for the switching element S1 constituting the upper arm element of the boosting chopper circuit is obtained from the control pulse signal /SDc. In this way, a period in which the pair of the switching elements S2, S4 constituting the lower arm element is turned on and a period in which the switching element S1 constituting the upper arm element is turned on are established as an inverted relationship.

In the SB mode, the bidirectional DC/DC conversion is performed between the DC power supplies 10a, 10b connected in series and the power line 20. It is therefore impossible to directly control the output power Pa of the DC power supply 10a and the output power Pb of the DC power supply 10b. In other words, the ratio between the output powers Pa and Pb of the DC power supplies 10a and 10b is automatically determined from the ratio between the voltages Va and Vb as described below in equation (4).

$$Pa/Pb = Va/Vb \quad (4)$$

It is to be understood that the sum of output powers (Pa+Pb) from the DC power supplies 10a, 10b is input to or output from the load 30 as in the case of the PB mode.

<Boosting Operation in PBD Mode>

Figure 11A:
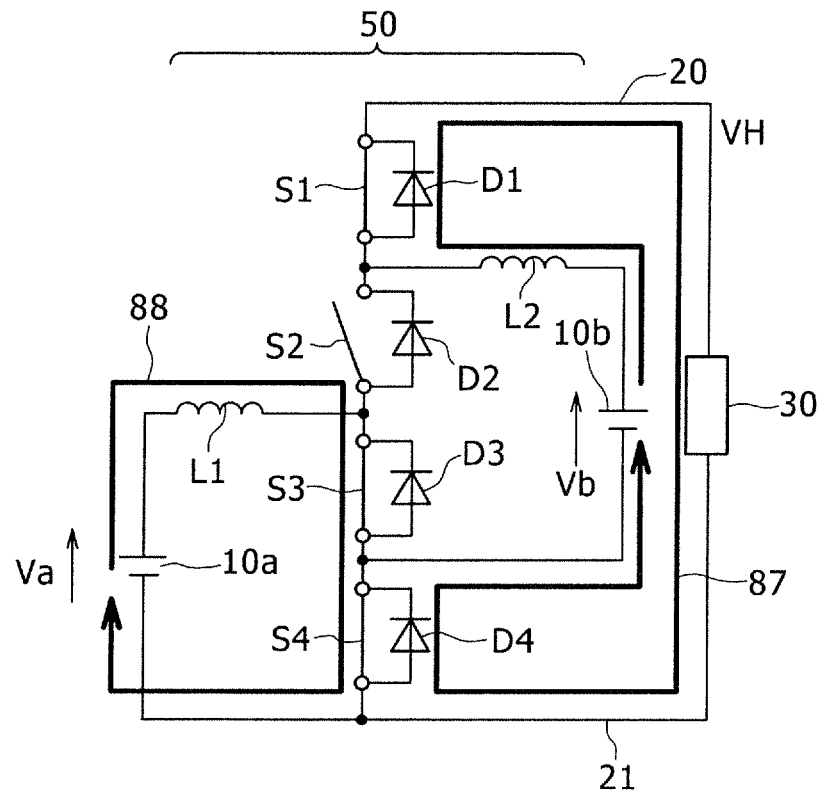
FIG. 11A is a circuit diagram for explaining DC-DC conversion performed on the first DC power supply along with a direct connection state of the second DC power supply in a PBD mode.
Figure 11B:
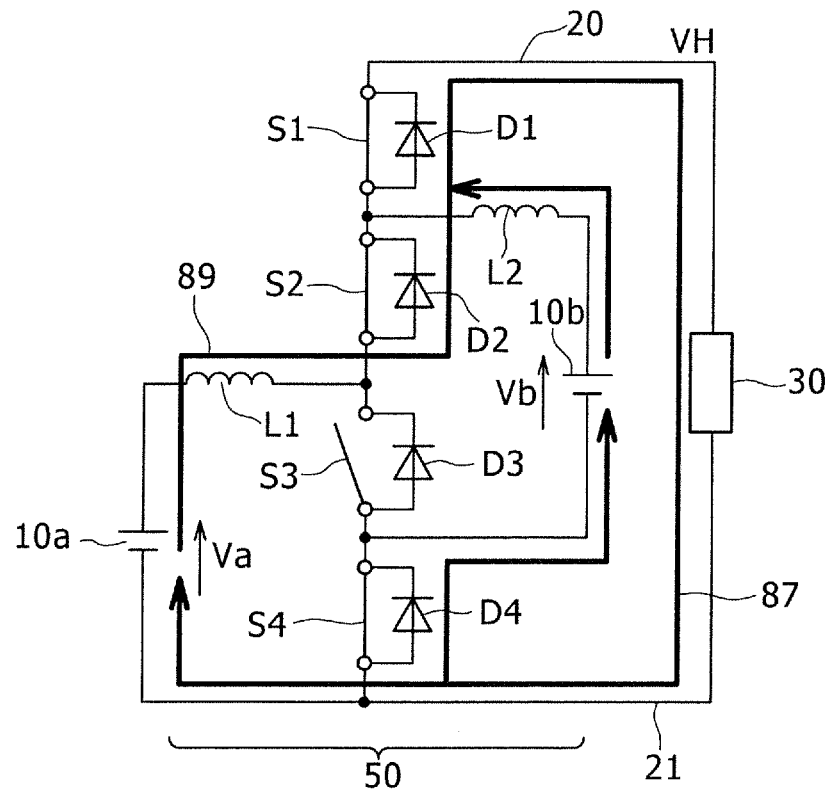
FIG. 11B is a circuit diagram for explaining DC-DC conversion performed on the first DC power supply along with the direct connection state of the second DC power supply in the PBD mode.

Next, referring to FIGS. 11A, 11B and 12, boosting operation in the PBD mode is described in detail below. FIGS. 11A, 11B show DC/DC conversion (boosting operation) performed on the DC power supply 10a in the PBD mode and a condition where the DC power supply 10b is directly connected to the power line 20 in parallel with the DC power supply 10a.

In the PBD mode, both of the switching elements S1 and S4 are fixed to the ON state as shown in FIGS. 11A and 11B. This allows the DC power supply 10b to be directly connected to the power line 20, and consequently forms an electric path 87 through which a current flows from the DC power supply 10b via the reactor L2, both the diode D1 and switching element S1, the power line 20, the load 30, the grounding line 21, and both the diode D4 and switching element S4 and back to the DC power supply 10b.

In the current path 87, the current can flow through the diodes D1, D4. For this reason, the current path 87 is formed by the direct connection of the DC power supply 10b to the electric line 20 without fixing the switching elements S1, S4 to the ON state in the PBD mode. When only output operation of the DC power supply 10b is considered, the switching elements S1, S4 may be on-off controlled similarly with the other switching elements S2, S3 during the below-described boosting operation for the DC power supply 10a. However, in the OFF state of the switching elements S1, S4, no electric path is formed for charging the DC power supply 10b with the generative power from the load 30. To avoid this situation, the switching elements S1, S4 are fixed to the ON state in this embodiment to secure the path for charging the DC power supply 10b with the regenerative power.

In the PDB mode, because the DC power supply 10b is directly connected to the power line 20 as described above, the voltage Vb of the DC power supply 10b is output to the power line 20 without undergoing the DC/DC conversion (DC voltage conversion). This causes the output voltage VH on the electric line 20 to become substantially equal to the voltage Vb of the DC power supply 10b, and makes it impossible to control the output voltage VH on the power line 20. Therefore, the PBD mode may be applied only when the voltage command value VH* for the output voltage VH on the power line 20 determined based on the power requested from the load 30 is lower than or equal to the voltage Vb of the DC power supply 10b. It should be noted that when the voltage Va of the DC power supply 10a is greater than the voltage Vb of the DC power supply 10b (Va>Vb), the PDB mode may be performed by directly connecting the DC power supply 10a to the power line 20 and performing the boosting operation on the DC power supply 10b.

Meanwhile, boosting operation almost the same as that in the PB mode described above with reference to FIGS. 4A to 6 is performed between the DC power supply 10a and the power line 20. As shown in FIG. 11A, the switching element S3 is turned on and the switching element S2 is turned off, to thereby form a current path 88 for storing energy in the reactor L1. This creates the state where the lower arm element of the boosting chopper circuit is turned on.

On the other hand, as shown in FIG. 11B, the switching element S3 is turned off and the switching element S2 is turned on, to thereby form a current path 89 for outputting the energy stored in the reactor L1 together with the energy of the DC power supply 10a. This creates the state where the upper arm element of the boosting chopper circuit is turned on.

When the first period in which the switching element S3 is turned on while the switching element S2 is turned off and the second period in which the switching element S2 is turned on while the switching element S3 is turned off are alternately repeated as described above, the boosting chopper circuit for the DC power supply 10a is established.

Here, in the DC/DC conversion operation shown in FIG. 11, the boosted voltage is controlled to lie in a voltage range in which the boosted voltage can be assumed to be equal to the voltage Vb of the DC power supply 10b (i.e., the output voltage VH on the power line 20). The description "the voltage range in which the boosted voltages can be assumed to be equal" used herein means that boosted voltages slightly higher or lower than the voltage Vb of the DC power supply 10b are incorporated. When the boosted voltage of the DC power supply 10a is defined to be slightly higher than the voltage Vb of the DC power supply 10b, the current Ib flowing from the DC power supply 10b is decreased whereas the current Ia flowing from the DC power supply 10a is increased, which can lead to an increase in the total current (Ia+Ib) that flows through the power line 20. Consequently, the total power PH supplied to the load 30 is increased.

Conversely, when the boosted voltage of the DC power supply 10a is defined to be slightly lower than the voltage Vb of the DC power supply 10b, the current Ia flowing from the DC power supply 10a is decreased by an amount greater than an increased amount of the current from the DC power supply 10b, which leads to a decrease in the total current (Ia+Ib) that flows through the power line 20. This results in a decrease of the total power PH supplied to the load 30.

The voltage obtained by boosting the DC power supply 10a in the PBD mode can be controlled by adjusting the duty ratio Da of the time period in which the switching element S3 constituting the lower arm element of the boosting chopper circuit is turned on. In other words, the adjustment of the duty ratio of the switching element S3 may be used to control an amount of electric power supplied from the DC power supply 10a to the power line 20 and to control the power allocation ratio between the DC power supplies 10a and 10b. Here, the relationship expressed by above-described equation (1) including the duty ratio Da is also established between the voltage Va of the DC power supply 10a and the output voltage VH on the power line 20 in the PBD mode as in the case of the PB mode.

Figures 12, 13:
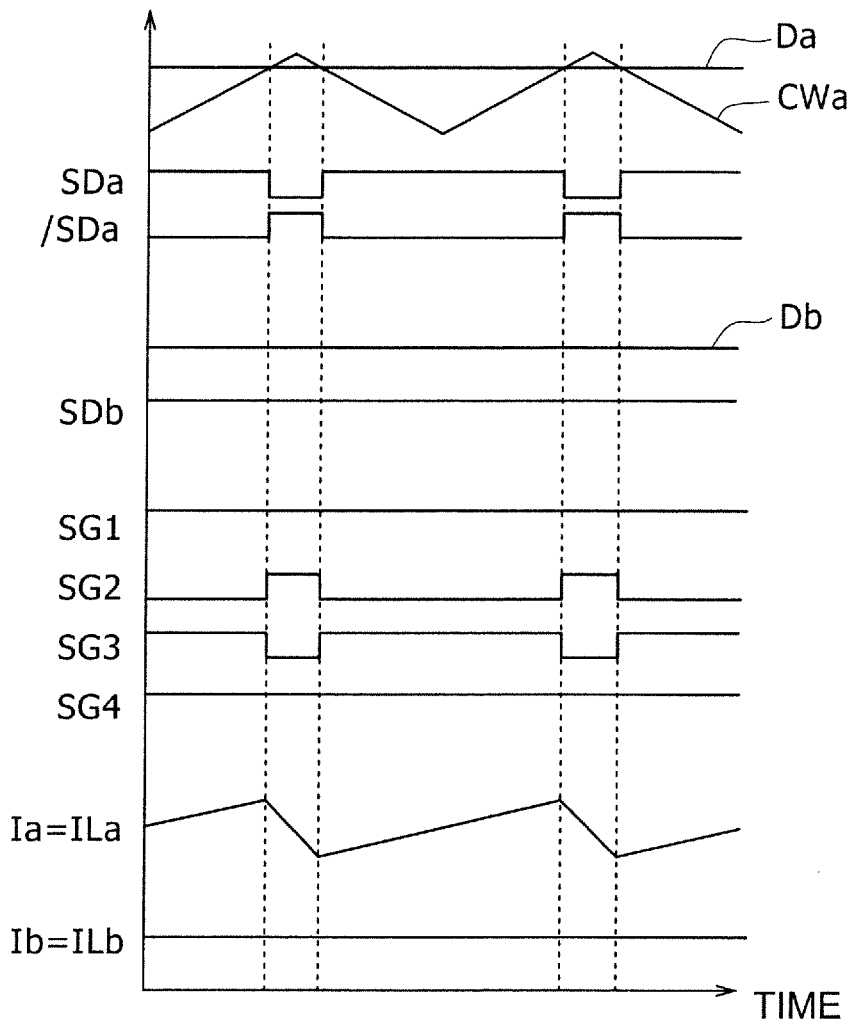
FIG. 12 is a waveform diagram showing exemplary operation to control each switching signal in the PBD mode.
FIG. 13 is a chart for explaining logical expressions used for defining operation to control each switching element in the PBD mode.

FIG. 12 shows a waveform diagram for explaining an example of operation for controlling the switching elements S1 to S4 in the PBD mode. Referring to FIG. 12, the output of the DC power supply 10b is set at the output voltage VH, and the output of the DC power supply 10a may be controlled to compensate for the current deviation in the current Ia (current control) in the PBD mode of this embodiment. Then, the command value (Ia*) for controlling the current can be established so as to adjust the output power from the DC power supply 10a. In this case, the duty ratio Da is calculated based on the current variation ΔIa (ΔIa=Ia*−Ia).

The control pulse signal SDa is generated based on a voltage comparison between the duty ratio Da for controlling the output of the DC power supply 10a and the carrier wave CWa. The control pulse signal /SDa is the signal inverted from the control pulse signal SDa. Meanwhile, the duty ratio Db of the switching element S1, S4 constituting the upper arm element is maintained constant and set to zero because the switching elements S1, S4 are maintained in the ON state. As a result, the control signals SG1, SG4 are fixed to the H levels as shown in FIG. 13, forming a so-called "upper arm ON" state.

As is evident from FIGS. 12 and 13, because the control signals SG2 and SG3 have an inverse relationship, the switching elements S2 and S3 are oppositely turned on and off. Further, the control signals SG1 and SG4 are maintained in the ON state. In this way, DC conversion operation can be performed on the DC power supply 10a according to the duty ratio Da.

In the PBD mode, a shortage of a power output from the current-controlled DC power supply 10a relative to the load power PL is to be supplied with the output from the directly-connected DC power supply 10b. In this case, the power allocation ratio between the DC power supplies 10a and 10b can be indirectly controlled by means of the setting of the current command value for controlling the current. Consequently, it becomes possible, in the PBD mode, to control the way in which the total power PH (PH=Pa+Pb) that is input to/output from the power line 20 as a whole from/to the DC power supplies 10a, 10b is allocated to the DC power supplies 10a and 10b. Further, the setting of the current command value may be used to activate operation for charging one of the DC power supplies with the power output from the other of the DC power supplies.

<Selection of Operation Mode>

Next, a process to select an operation mode used for power converter control in this embodiment is described. FIG. 14 shows controllability of a power allocation ratio k between the DC power supplies 10a and 10b and a settable range of the output voltage VH in each of the operation modes shown in FIG. 13.

Referring to FIG. 14, in the PB mode, the setting of the current command value in the DC power supply subjected to current control may be used to control the power allocation ratio k between the DC power supplies 10a and 10b. The power allocation ratio k used herein is defined as a ratio (k=Pa/PH) of the output power Pa from the DC power supply 10a to the total power PH (PH=Pa+Pb). Namely, in the PB mode, any value arbitrarily selected from a range of from 0 to 1.0 may be assigned to the power allocation ratio k. Meanwhile, in the PB mode, the output voltage VH may be controlled within a range from a maximum voltage max(Va, Vb) of the voltages Va, Vb to an upper limit voltage VHmax, which is an upper limit in control of the output voltage VH. In this case, when Va>Vb, max(Va, Vb) is equal to Va, and when Vb>Va, max(Va, Vb) is equal to Vb. Here, the upper limit voltage VHmax is defined taking into account component properties, such as a pressure resistant property.

Meanwhile, in the PBD mode, the setting of the current command value Ia* in the current-controlled DC power supply 10a may be also used to control the power allocation ratio k between the DC power supplies 10a and 10b. However, as contrasted with the PB mode in which the duty ratio can be independently controlled for each DC power supply 10a, 10b, the PBD mode is performed under the constraint that the boosted voltage of the DC power supply 10a should be substantially equal to the output voltage Vb supplied from the DC power supply 10b to the power line 20. Therefore, the settable range of the power allocation ratio k is limited to a range narrower than that in the PB mode. Further, in the PBD mode, the output voltage VH to the power line 20 is uniquely determined by the voltage Vb of the DC power supply 10b directly connected to the power line 20.

In the other operation modes, the power allocation ratio k is 1 or 0 in the aB, bB, aD, and bD modes in which only one of the DC power supplies is used. Further, in the SB and SD modes, because the power allocation ratio k is uniquely determined by the ratio between the voltages Va and Vb of the DC power supplies 10a and 10b, it is not possible to perform power allocation control. Also in the PD mode in which the power allocation ratio k is uniquely determined by a ratio between internal resistances Ra and Rb of the DC power supplies 10a and 10b directly connected to the power line 20 in parallel, power allocation cannot be controlled.

In the power supply system 1, the output voltage VH supplied to the load 30 is defined depending on operating states (such as, for example, a torque and the number of revolutions) of the load 30. When the load 30 is the motor generator 35 mounted as a drive force generator in the electric vehicle as illustrated in FIG. 2, a load request voltage VHrq of the motor generator 35 is defined based on a vehicle speed, an accelerator opening degree, and other factors. The output voltage VH on the power line 20, which is a voltage supplied to the load 30, should be defined to be equal to the load request voltage VHrq or higher. Thus, applicable operation modes of the power converter 50 can vary depending on a range of the load request voltage VHrq defined based on the operating states of the load 30.

Figures 15, 16:
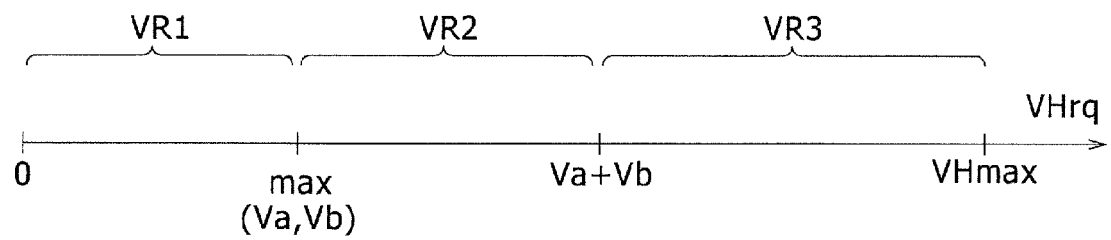
FIG. 15 is a conceptual diagram for explaining definition of each range of load request voltages.
FIG. 16 is a chart for explaining selection of an operation mode for each voltage range shown in FIG. 15.

FIG. 15 shows definitions of voltage ranges VR1 to VR3 of the load request voltage VHrq. FIG. 16 is a chart for explaining selection of the operation mode for each voltage range.

Referring to FIG. 15, the load request voltage VHrq is determined as any one of the voltage ranges VR1 [VHrq≤max(Va, Vb)], VR2 [max(Va, Vb)<VHrq≤(Va+Vb)], and VR3 [(Va+Vb)<VHrq≤VHmax].

The power converter 50, which cannot output a voltage lower than max(Va, Vb), is incapable of matching the output voltage VH with the load request voltage VHrq when the load request voltage VHrq lies within the voltage range VR1. Therefore, as shown in FIG. 16, the aD, bD, PD, and PBD modes are selected as an applicable operation mode group in order to bring the output voltage VH as close to the load request voltage VHrq as possible within the range of VH≥VHrq.

In the aB, bD, and PB modes belonging to the boosting mode other than the PBD mode, the output voltage VH can be controlled according to the voltage control value VH*, as long as the load request voltage VHrq lies within the range of from max(Va, Vb) to VHmax. On the other hand, in the SB mode, the output voltage VH cannot be controlled to be lower than (Va+Vb). In other words, the output voltage VH can be controlled according to the voltage command value VH* only within the range from (Va+Vb) to VHmax.

In the voltage range VR2, the aB, bB, and PB modes are selected as the applicable operation mode group in light of the controllable range of the output voltage VH in each of the aB, bB, and PB modes. When any operation mode in this group is applied, the output voltage VH can be matched with the load request voltage VHrq by defining that VH*=VHrq. On the other hand, the aD, bD, PD, and PBD modes cannot be applied, due to deficiency in voltage.

On the other hand, the SD mode, which satisfies the condition that VH≥VHrq, can be applied in the voltage range VR2. Although it is not possible in the SD mode to match the output voltage VH (VH=Va+Vb) with the load request voltage VHrq, the loss in the power converter 50 can be greatly reduced, due to the absence of switching operation. For this reason, there is a possibility that the power loss in the entire power supply system 1 is reduced more greatly than the cases where the aB, bB, and PB modes are applied. In this regard, the SD mode may be included in the applicable operation mode group for the voltage rage VR2. Conversely, the SB mode is excluded from the applicable operation mode group for the voltage range VR2, because both a difference between the output voltage VH and the load request voltage VHrq and the power loss in the power converter 50 are greater than those in the SD mode.

For the voltage range VR3, the PB, SB, aB, and bB modes are selected as the applicable operation mode group in light of the controllable range of the output voltage VH in the above-described operation modes. When any operation mode in this group is applied, the output voltage VH can be matched with the load request voltage VHrq by defining VH*=VHRq. Meanwhile, none of the direct connection modes (of the aD, bD, PD, and SD modes) and the PBD mode is applicable, due to deficiency in voltage.

Referring to FIG. 16, each voltage range VR1, VR2, VR3 includes a plurality of operation modes. The controller 40 applies one operation mode selected from those operation modes. Here, the controller 40 can selects one operation mode so as to minimize the total loss in the entire power supply system 1 based on both the load request voltage VHrq determined depending on the operating states of the load 30 and the power supply states (such as, for example, the SOC and charge/discharge limits) of the DC power supplies 10a, 10b. The power supply states include, for example, the voltages Va, Vb, the currents Ia, Ib, temperatures Ta, Tb, etc. Further, the output powers Pa, Pb of the DC power supplies 10a, 10b can be determined from the total power PH and the power allocation ratio k.

A specific example is described in which the controller 40 selects one operation mode from a plurality of operation modes taking into account losses in the entire power supply system 1. The losses in the power supply system 1 include a converter loss Plcv arising in the power converter 50, a load loss Plld arising in the load 30, a power supply loss Plps produced by the internal resistances Ra, Rb of the DC power supplies 10a, 10b, etc.

The converter loss Plcv includes switching losses resulting from the on-off control of the switching elements S1 to S4 and iron losses in the reactors L1, L2. However, the switching losses do not arise in the direct connection modes of the aD, bD, SD, and PD modes, because each of the switching elements S1 to S4 is fixed to the ON or OFF state. Thus, in this case, the converter loss Plcv is proportional to a current passing through the power converter 50.

The converter loss Plcv can be estimated for each applicable operation mode as a function of the load request voltage VHrq (or the output voltage VH) and both the voltages Va, Vb and the output powers Pa, Pb of the DC power supplies 10a, 10b, based on a previously created map or arithmetic expression. Here, the output powers Pa, Pb can be determined from the total power PH (PH=Pa+Pb) and the power allocation ratio k. Specifically, the output powers Pa and Pb may be calculated as Pa=PH×k and Pb=PH×(1−k), respectively. The power allocation ratio k used herein may be determined based on the states of the DC power supplies 10a, 10b (such as, for example, balances between the SOCs and the charge/discharge limits), the output level (PH), or the like with reference to the previously created map. It should be noted that the above-described map or arithmetic expression may be determined in advance based on experimental results or simulated results. This applies in the following.

The load loss Plld may be estimated for each applicable operation mode as a function of the load request voltage VHrq (or the output voltage VH) and the operating states of the load 30, including the torque, the number of revolutions, and the like, in accordance with the previously created map or arithmetic expression.

The power supply loss Plps may be estimated for each applicable operation mode as a function of both the internal resistances Ra, Rb and the voltage Va, Vb of the DC power supplies 10a, 10b and the total power PH, based on the previously created map or arithmetic expression. Because the internal resistances Ra, Rb of the DC power supplies 10a, 10b can be changed depending on the states (such as, for example, the temperatures Ta, Tb and the states of charge SOCa, SOCb) of the DC power supplies 10a, 10b, the internal resistances Ra, Rb are estimated from the present power supply states in accordance with the map or arithmetic expression.

The controller 40 calculates and compares the sum of the thus-estimated converter loss Plcv, load loss Plld, and power supply loss Plps for each applicable operation mode. Then, from the plurality of applicable operation mode groups, the controller 40 selects the one operation mode for which the minimum sum of the losses is calculated. The selected operation mode is used to control the power converter 50, which can minimize the losses in the entire power supply system 1 and, in turn, improve the efficiency.

<Power Converter Control by Controller>

Figure 17:
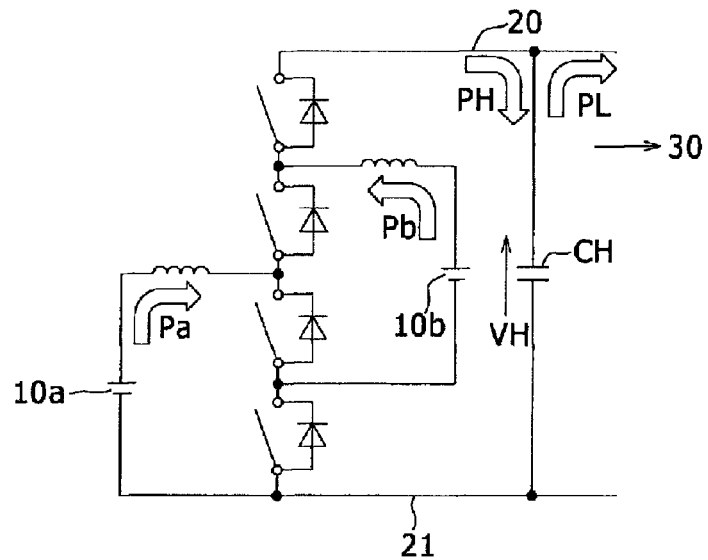
FIG. 17 is a schematic diagram for explaining a basic idea on power converter control in this embodiment.

FIG. 17 is a diagram for explaining a basic concept of power converter control in the power supply system according to this embodiment. Referring to FIG. 17, the output voltage VH increases in a condition that the total power PH is greater than the load power PL (PH>PL), and decreases in a condition that PH<PL. Taking into account the conditions, the command value for the total power PH is established based on the voltage deviation $\Delta$VH in the output voltage VH relative to the voltage command value VH*. Further, the total power PH is allocated to the output powers Pa and Pb, to thereby perform power control (current control) on each output from the DC power supplies 10a and 10b.

Figure 18:
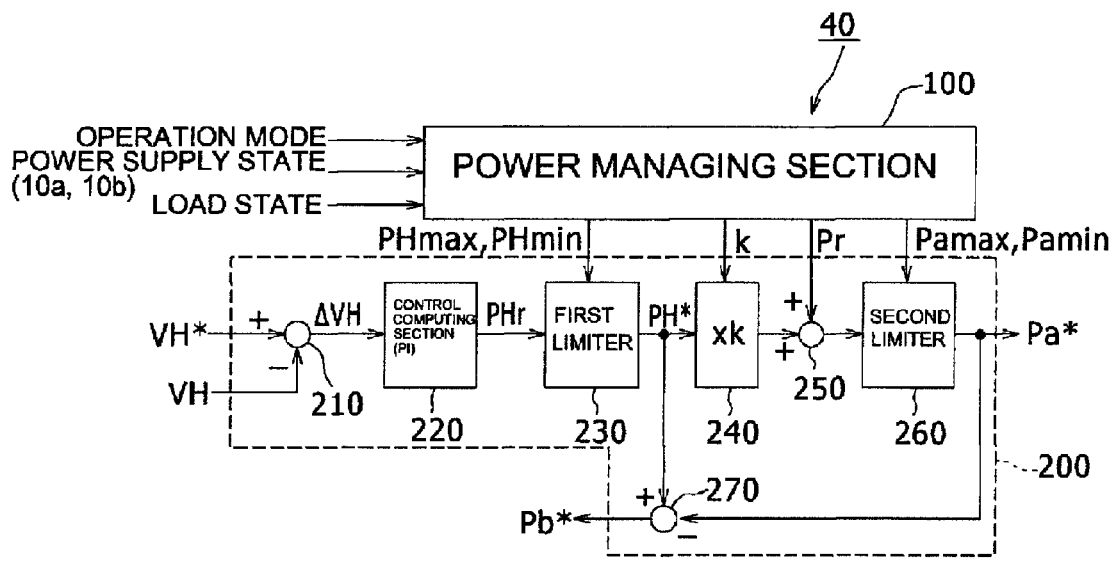
FIG. 18 is a block diagram for explaining the power converter control in this embodiment.
Figure 19:
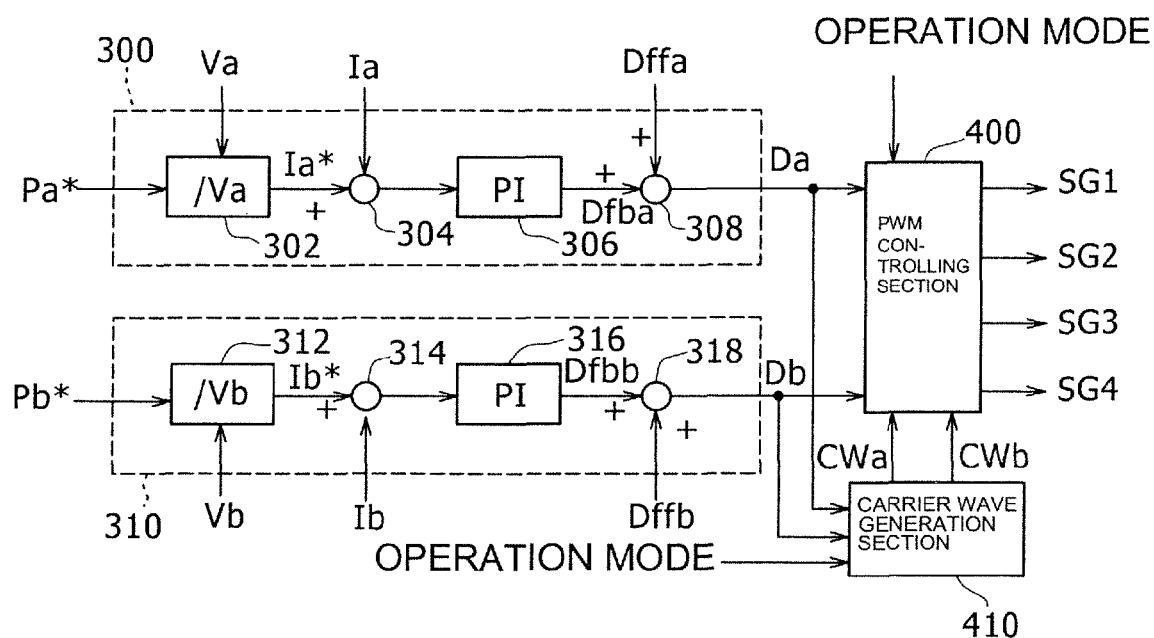
FIG. 19 is another block diagram for explaining the power converter control in this embodiment.

FIGS. 18 and 19 show block diagrams for explaining the power converter control in this embodiment. FIG. 18 shows components used for control computation to define the power command value for each DC power supply, and FIG. 19 shows components used for control computation to control each output of the DC power supplies in accordance with the defined power command value. In the following, components used for control operation in the PB mode are described first, and control operation in the other boosting modes is subsequently described.

Referring to FIG. 18, the controller 40 includes a power managing section 100 and a power controlling section 200.

The power managing section 100 establishes power upper and lower limit values PHmax and PHmin associated with the total power PH, a discharge limiting value Paout and a charge limiting value Pain for the DC power supply 10a, a discharge limiting value Pbout and a charge limiting value Pbin for the DC power supply 10b, and the power allocation ratio k between the DC power supplies 10a and 10b based on the operating states of the DC power supply 10a, 10b and/or the load 30. Here, the power upper limit value PHmax associated with the total power PH may be determined as the sum of the discharge limiting values Paout, Pbout for the DC power supplies 10a, 10b (PHmax=Paout+Pbout). On the other hand, the power lower limit value PHmin associated with the total power PH may be determined as the sum of the charge limiting values Pain, Pbin for the DC power supplies 10a, 10b (PHmin=Pain+Pbin).

Further, the power managing section 100 can define the power allocation ratio k as described below. The power allocation ratio k may be assigned an arbitrary value within the range of 0≤k≤1.0 in the PB mode as described above, and may be assigned, in the PBD mode, a value in a predetermined range that is narrower than the above range in the PB mode.

The power managing section 100 is further able to set a circulating power value Pr for allowing charge and discharge operation between the DC power supplies 10a and 10b. The circulating power value Pr is equivalent to the power that is output from the DC power supply 10a to charge the DC power supply 10b. In the power running action, for example, when the setting that Pr>0 is established under the condition where k=1, the DC power supply 10b can be charged while supplying the total power PH to the power line 20 from the output power of the DC power supply 10a. On the other hand, when the setting that Pr<0 is established under the condition where k=0, the DC power supply 10a can be charged while supplying the total power PH to the power line 20 from the output of the DC power supply 10b.

Meanwhile, in the regenerative action (PH<0), the setting that Pr>0 established under the condition where k=0 allows the DC power supply 10b to be charged with both the regenerative power from the load 30 and the output power from the DC power supply 10a. On the other hand, the setting that Pr<0 established under the condition where k=1 allows the DC power supply 10a to be charged with both the regenerative power from the load 30 and the output power from the DC power supply 10b.

In contrast, when no value is assigned to the circulating power value Pr (Pr=0), the charge/discharge operation is not performed between the DC power supply 10a and 10b. For example, when there is an imbalance between the SOCs of the DC power supplies 10a and 10b, the power managing section 100 can assign the circulating power value Pr the value that facilitates charging of the one of the DC power supplies 10a, 10b whose SOC is lower.

The power controlling section 200 sets the power command values Pa*, Pb* for the DC power supplies 10a, 10b based on the voltage deviation in the output voltage VH. The power controlling section 200 includes a deviation computing section 210, a control computing section 220, a first limiter 230, a power allocating section 240, a circulating power adding section 250, a second limiter 260, and a subtracting section 270.

The deviation computing section 210 computes the voltage deviation $\Delta$VH ($\Delta$VH=VH*−VH) that is a difference between the voltage command value VH* and a detection value of the output voltage VH. The control computing section 220 computes, based on the voltage deviation $\Delta$VH, a total power PHr required for controlling the voltage. For example, the control computing section 220 computes the required total power PHr through a PI computation using equation (5) described below.

$$PHr = Kp \cdot \Delta VH + \Sigma(Ki \cdot \Delta VH) \quad (5)$$

In above equation (5), Kp represents a proportional control gain, and Ki represents an integral control gain. The control gains also reflect a capacitance of the smoothing capacitor CH. When the required total power PHr is determined based on equation (5), feedback control for reducing the voltage deviation $\Delta$VH can be achieved.

The first limiter 230 limits the power command value PH* to the range of from PHmax to PHmin defined by the power managing section 100. Under a condition that PHr>PHmax, the first limiter 230 defines the power command value PH* as PH*=PHmax. Similarly, in a condition that PHr<PHmin, the first limiter 230 defines the power command value PH* as PH*=PHmin. Further, under a condition that PHmax≥PHr≥PHmin, the power command value PH* is maintained as PH*=PHr. In this way, the total power command value PH* is determined.

The power allocating section 240 computes, based on the total power command value PH* and the power allocation ratio k, an output power k·PH* allocated to the DC power supply 10a. The circulating power adding section 250 adds the output power k·PH* calculated by the power allocating section 240 and the circulating power value Pr defined by the power managing section 100 to obtain a power Par that is required of the DC power supply 10a (Par=k·PH*+Pr).

The second limiter 260 limits the power command value Pa* for the DC power supply 10a to the range from Paout to Pain defined by the power managing section 100.

If the obtained power Par satisfies a condition that Par>Paout, the second limiter 260 corrects for the power command value Pa* as Pa*=Paout. Similarly, under a condition that Par<Pain, the second limiter 260 corrects for the power command value Pa* as Pa*=Pain. On the other hand, under a condition that Pamax≥Par≥Pain, the second limiter 260 maintains the power command value Pa* as Pa*=Par. In this way, the power command value Pa* is determined for the DC power supply 10a.

The subtracting section 270 subtracts the power command value Pa* from the total power command value PH* to determine the power command value Pb* for the DC power supply 10b (Pb*=PH*−Pa*).

As shown in FIG. 19, the controller 40 includes current controlling sections 300, 310, a PWM controlling section 400, and a carrier wave generating section 410, which are used for controlling the outputs from the DC power supplies 10a, 10b in accordance with the power command values Pa*, Pb*. The current controlling section 300 performs current control to control the output from the DC power supply 10a. The current controlling section 310 performs current control to control the output from the DC power supply 10b.

The current controlling section 300 includes a current command generating section 302, a deviation computing section 304, a control computing section 306, and an FF adding section 308.

The current command generating section 302 determines the current command value Ia* (Ia*=Pa*/Va) for the DC power supply 10a based on the power command value Pa* and a detection value of the voltage Va. The deviation computing section 304 computes the current deviation ΔIa which is a difference between the current command value Ia* and the detection value of the current Ia (ΔIa=Ia*−Ia). The control computing section 306 computes a controlled variable Dfba in current feedback control based on the current deviation ΔIa. For example, the control computing section 306 computes the variable Dfba through the PI computation using equation (6) as follows.

$$Dfba = Kp \cdot \Delta Ia + \Sigma(Ki \cdot \Delta Ia)$$

In equation (6), Kp represents the proportional control gain, and Ki represents the integral control gain. The control gains are determined independently of the above-described equation (5).

Meanwhile, an FF controlled variable Dffa in voltage feedforward control is determined by equation (7) in accordance with an equation Da=(VH−Va)/VH obtained by solving equation (1) for Da.

$$Dffa = (VH^* - Va)/VH^* \qquad (7)$$

The FF adding section 308 adds the FB controlled variable Dfba and the FF controlled variable Dffa to obtain the duty ratio Da associated with operation to control the output of the DC power supply 10a. Similarly with equation (1), the duty ratio Da is equivalent to the duty ratio of the period for turning on the lower arm element (switching elements S3, S4) of the boosting chopper circuit (FIG. 4) used in the DC/DC conversion between the voltage Va of the DC power supply 10a and the output voltage VH.

The current controlling section 310 includes a current command generating section 312, a deviation computing section 314, a control computing section 316, and an FF adding section 318.

The current command generating section 312 determines the current command value Ib* for the DC power supply 10b based on the power command value Pb* and a detection value of the voltage Vb (Ib*=Pb*/Vb). The deviation computing section 314 computes the current deviation ΔIb which is the difference between the current command value Ib* and the detection value of the current Ib (ΔIb=Ib*−Ib). The control computing section 316 computes a controlled variable Dfbb in current feedback control based on the current deviation ΔIb. For example, the control computing section 316 computes the variable Dfbb through the PI computation using equation (8) as follows.

$$Dfbb = Kp \cdot \Delta Ib + \Sigma(Ki \cdot \Delta Ib)$$

In equation (8), Kp represents the proportional control gain, and Ki represents the integral control gain. The control gains are determined independently of equations (5) and (6) described above.

Meanwhile, an FF controlled variable Dffb in voltage feedforward control is determined by equation (9) in accordance with an equation Db=(VH−Vb)/VH obtained by solving equation (2) for Db.

$$Dffb = (VH^* - Vb)/VH^* \qquad (9)$$

The FF adding section 318 adds the FB controlled variable Dfbb and the FF controlled variable Dffb to obtain the duty ratio Db associated with operation to control the output of the DC power supply 10b. Similarly with equation (2), the duty ratio Db is equivalent to the duty ratio of the period for turning on the lower arm element (switching elements S2, S3) of the boosting chopper circuit (FIG. 5) used in the DC/DC conversion between the voltage Vb of the DC power supply 10b and the output voltage VH.

The PWM controlling section 400 performs pulse width modulation control based on both the duty ratios Da, Db defined by the current controlling sections 300, 310 and the carrier waves CWa, CWb from the carrier wave generating section 410, to generate the control signals SG1 to SG 4 for the switching elements S1 to S4. The pulse width modulation control and generation of the control signals SG1 to SG4 in the PWM controlling section 400 are performed in a way similar to those described with reference to FIGS. 6 and 7, and their detailed descriptions are not repeated.

As such, according to the power conversion control in this embodiment, the voltage deviation in the output voltage VH can be converted into the power command value through the DC/DC conversion in the PB mode, and the current control can be performed on each output from the DC power supplies 10a, 10b, to thereby control the output voltage VH to match the voltage command value VH*. In this way, it can be ensured that each DC power supply 10a, 10b is protected from overpower (i.e. overcharge or overdischarge) on an output power basis. Further, it is also possible to easily control the power allocation ratio k between the DC power supplies 10a and 10b. and the circulating power value Pr.

Particularly, in the PB mode, the power command value can be directly limited with respect for one of the DC power supplies 10a, 10b. In the exemplary configuration of FIG. 17, the power command value Pa* for the DC power supply 10a can be reliably limited to the range of Pain≤Pa*≤Paout by the second limiter 260. This can ensure that the DC power supply 10a is precisely protected against overpower.

Next, the power converter control in the boosting modes other than the PB mode; i.e. the aB, bB, SB, and PBD modes, is described.

In the aB mode, the total power command value PH* is established by means of the deviation computing section 210, the control computing section 220, and the first limiter 230 in a manner similar with the PB mode. Because the DC power supply 10b is not used in the aB Mode, the power upper and lower limit values PHmax and PHmin given to the first limiter 230 may be defined to be equivalent to the charge and discharge limiting values Paout and Pain for the DC power supply 10a.

In the aB mode, the power allocation ratio k is set as k=1, because the output power is delivered only from the DC power supply 10a. Further, the circulating power value Pr is fixed to 0, because the DC power supply 10b is not used (is blocked from charge/discharge operation). Here, one of the first and second limiters 230, 260 may be deactivated, because the second limiter 260 can also limit the power command value Pa* (=PH*) to the discharge limiting value Paout and the charge limiting value Pain.

Further, in the configuration of FIG. 19, current feedback control is performed only on the DC power supply 10a. Namely, the current controlling section 300 functions to generate the duty ratio Da as in the case of the PB mode. On the other hand, the current controlling section 310 may be deactivated in the aB mode, due to the absence of the boosting operation performed on the DC power supply 10b. In other words, computation of the duty ratio Db is not performed.

Next, the control in the bB mode is described. In the bB mode, control operation opposite to that in the above-described aB mode is performed. Specifically, because the DC power supply 10a is not used in the bB mode, the power upper and lower limit values PHmax and PHmin given to the first limiter 230 may be defined to be equivalent to the discharge limiting value Pbout and the charge limiting value Pbin for the DC power supply 10b, respectively. In this way, the total power command value PH* (=Pb*) is limited to a range of Pbin≤PH*≤Pbout.

In the bB mode using only the DC power supply 10b to deliver the output power, the power allocation ratio k is set to 0. Further, the circulating power value Pr is fixedly set to 0, because the DC power supply 10a is not used (is blocked from charge/discharge operation). Still further, in the configuration of FIG. 19, current feedback control is performed only on the DC power supply 10b. In other words, the current controlling section 310 functions in a manner similar with that in the PB mode to generate the duty ratio Db. On the other hand, the current controlling section 300 may be deactivated in the bB mode, due to the absence of the boosting operation performed on the DC power supply 10a. That is, computation of the duty ratio Da is not performed.

In the following, the control in the SB mode is described. In the SB mode, the bidirectional DC/DC conversion is performed in the condition where the DC power supplies 10a, 10b are serially connected between the power line 20 and the serially-connected DC power supplies 10a, 10b as described above. Accordingly, the same current flows through the DC power supplies 10a and 10b (Ia=Ib). It is therefore impossible to directly control the output power Pa of the DC power supply 10a and the output power Pb of the DC power supply 10b, and the ratio between the output powers Pa and Pb is automatically determined from the ratio between the voltages Va and Vb according to equation (4) (Pa/Pb=Va/Vb).

Further, in the SB mode, the power allocation ratio k is established based on the detection values of the voltages Va, Vb of the DC power supplies 10a, 10b, by equation (10) obtained in accordance with equation (4).

$$k = Va/(Va+Vb) \qquad (10)$$

Still further, in the SB mode, the circulating power value Pr is set to 0, because charge/discharge operation cannot be performed between the DC power supplies 10a and 10b.

With the above settings, the total power command value PH* is defined based on the voltage deviation ΔVH in the output voltage VH as in the case of the PB mode, and is limited to the range from PHmax to PHmin by the first limiter 230 in the configuration of FIG. 18. Then, the total power command value PH* is allocated to the power command values Pa* and Pb* (Pa*=k·PH*, Pb*=PH*−Pa*) in accordance with the power allocation ratio calculated by equation (10).

In the PB mode, the current feedback control is performed on either one of the DC power supplies 10a, 10b, due to the condition that Ia=Ib. For example, the current controlling section 300 performs the power feedback control on the DC power supply 10a having the power command value Pa* which can be directly controlled by the second limiter 260.

On the other hand, the current feedback control is disabled in the current controlling section 310 by setting the control gain in the control computing section 316; namely, Kp, Ki in equation (8), to zero. Therefore, the duty ratio Db (Db=Dffb) is calculated in the current controlling section 310 only by the feedforward control based on the voltage Vb.

Next, control in the PBD mode will be described. Also in the PBD mode, the power command value PH* is generated based on the voltage command value VH* and the output voltage VH by the deviation computing section 210, the control computing section 220, and the first limiter 230 in a manner similar with that in the PB mode.

In the PBD mode, however, because the DC power supply 10b is directly connected to the power line 20, the power command value PH* cannot be allocated at any arbitrary power allocation ratio k (0≤k≤1). In other words, the power command value PH* can be controlled only in the voltage range in which the output voltage VH on the power line 20 can be assumed to be equal to the voltage Vb of the DC power supply 10b, which causes the output power delivered from the DC power supply 10b to be maintained almost constant as Pb (i.e., Pb*)=Ib·Va.

Therefore, when the PBD mode is applied, the power managing section 100 in the controller 40 supplies the power allocating section 240 with the power allocation ratio k that is not arbitrarily defined as in the case of the PB mode but specifically defined such that the power command value Pa* of the DC power supply 10a has a value obtained by subtracting the power command value Pb*, which can be output from the DC power supply 10b, from the power command value PH*. This limits, as described above, the power allocation ratio k in the PBD mode to the narrower range than that in the PB mode.

Also in the PBD mode, the first limiter 230 limits the power command value PH* to the range of PHmin≤PH*≤PHmax, the circulating power adding section 250 adds the circulating power Pr to the power command value PH*, and the second limiter 260 limits the power command value Pa* to the range of Pain≤Pa*≤Paout, which are similarly performed as in the case of the PB mode.

The power command values Pa*, Pb* generated for the DC power supplies 10a, 10b as described above are provided to the control configuration shown in FIG. 19.

In the current controlling section 300, current feedback control similar with that in the PB mode is performed such that the output power Pa corresponding to the power command value Pa* is output from the DC power supply 10a. On the other hand, the DC power supply 10b is maintained in the condition directly connected to the power line 20 by fixing the switching elements S1, S4 of the power converter 50 to the ON state. Accordingly, the current controlling section 310 in FIG. 19 is deactivated, so that no DC/DC conversion is performed on the DC power supply 10b.

As such, according to the power converter control of this embodiment, control operation of the power converter 50 shown in FIG. 1 may be performed by the control configurations shown in FIGS. 18 and 19, and the control configurations can be shared among the operation modes belonging to the boosting mode for controlling the output voltage VH to match the voltage command value VH*. This can lead to a reduced control computation load in operation to control the power converter 50 to which the plurality of operation modes are selectively applied. Further, the operation modes can be smoothly switched, which can contribute to improved controllability.

<Power Limiting Process in PBD Mode>

Referring next to FIGS. 20A to 24, a power limiting process in the PBD mode will be described.

Figure 20A:
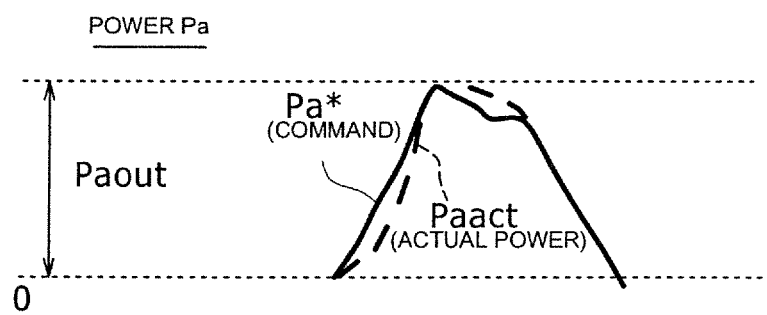
FIG. 20A is a diagram for explaining a situation where a power output from the DC power supply subjected to power control in the PBD mode exceeds a discharge limiting value.
Figure 20B:
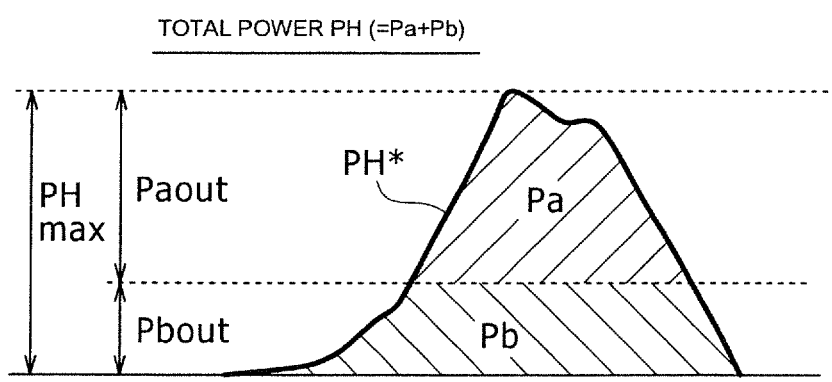
FIG. 20B is a diagram for explaining the situation where the power output from the DC power supply subjected to the power control in the PBD mode exceeds the discharge limiting value.

FIGS. 20A, 20B show an example for allocating power to the DC power supplies 10a, 10b in the PBD mode. FIG. 20A shows only the power output from the DC power supply 10a in the PBD mode, and FIG. 20B shows the total power command value PH* as the sum of the powers Pa and Pb respectively output from the DC power supplies 10a and 10b.

Referring to FIG. 20A, the power Pa to be output from the DC power supply 10a in the PBD mode is controlled by the current controlling section 300 of FIG. 19 in accordance with the power command value Pa* generated by the power controlling section 200 previously described with reference to FIG. 18. Further, the power command value Pa* is limited to the discharge limiting value Paout associated with the DC power supply 10a or lower by the second limiter 260 in the power controlling section 200. In this way, the DC power supply 10a is controlled so as not to be discharged excessively.

However, a response of the power converter 50 may be delayed in some cases. In such a case, the power Pa actually supplied from the power converter 50 to the power line 20 may fall short of the power command value Pa* for the DC power supply 10a. Such a shortage of the power is drawn from the DC power supply 10b directly connected to the power line 20 while the shortage is present, which causes the DC power supply 10b to temporarily output excessive power greater than the discharge limiting value Pbout associated with the DC power supply 10b. This can cause deterioration of the DC power supply 10b to progress.

Then, in this embodiment, a power limiting process as described below is performed to appropriately keep the DC power supply 10b on a directly connected side against overdischarge when the PBD mode is applied.

Figure 21:
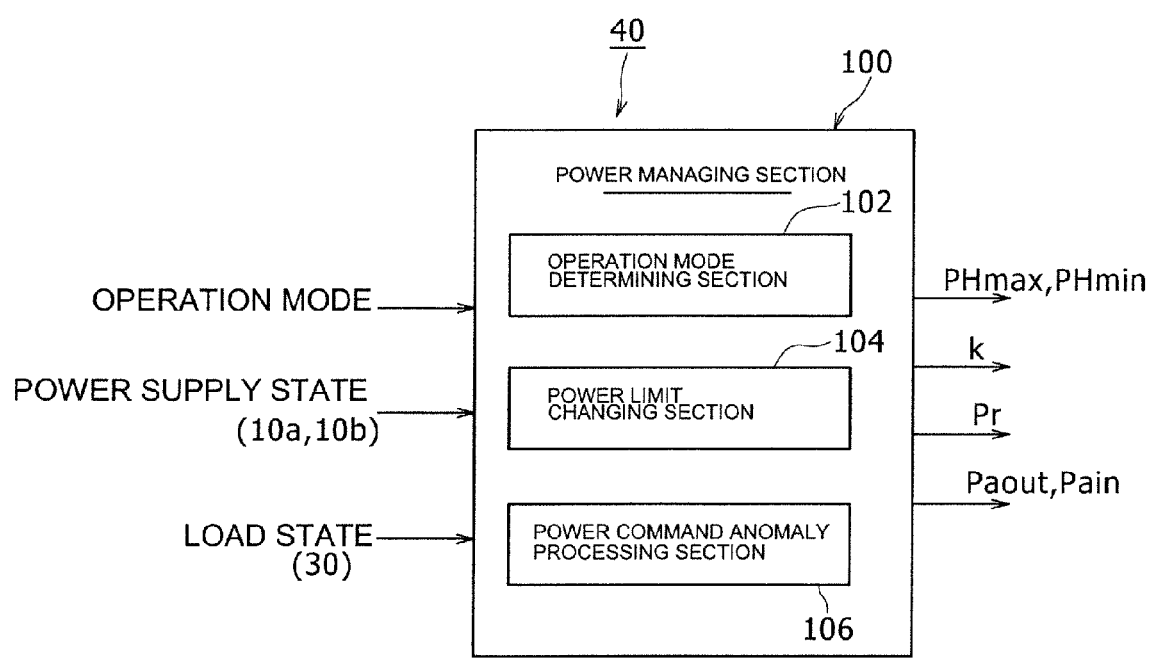
FIG. 21 is a functional block diagram showing a power managing section that performs a power limiting process when the PBD mode is selected.

FIG. 21 is a functional block diagram showing components related to the power limiting process in the power managing section 100 contained in the controller 40. The power managing section 100 includes an operation mode determining section 102, a power limit changing section 104, and a power command anomaly processing section 106.

The operation mode determining section 102 functions to determine whether or not the PBD mode is selected from among the plurality of operation modes shown in FIG. 3. The selection of the PBD mode can be determined from the operating stats of the switching elements S1 to S4, the value of the output voltage VH, and other factors. Specifically, for example, when the output voltage VH on the power line 20 belongs to the voltage range VR1 (FIG. 15), and the control signals SG2, SG3 for the switching elements S2, S3 are controlled based on the duty ratio Da in the condition where the control signal SG1 for the switching elements S1, S4 is fixed to the H level, it can be determined that the PBD mode is selected.

The power limit changing section 104 functions to change the power limiting value associated with the power command value PH* for the total power PH when the PBD mode is applied. More specifically, in the configuration shown in FIG. 18, the total power command value PH* is limited as PH*≤PHmax (PHmax=Paout+PBout) by the first limiter 230, and the power command value Pa* for the DC power supply 10a is limited as Pa*≤Paout by the second limiter 260. Here, in the operation modes other than the PBD mode, it is established that PHmax=Paout+Pbout. On the other hand, when the PBD mode is selected, the power limit changing section 104 changes the above setting in such a manner that the sum of the actual power Paact of the DC power supply 10a and the discharge limiting value PBout for the DC power supply 10b is established as the maximum value PHmax of the total power PH. Here, for the actual power Paact of the DC power supply 10a, a value calculated as the product of the current Ia and the voltage Va detected for the DC power supply 10a (Paact=Ia·Va) may be used. In this embodiment, however, it is possible to calculate the actual power Paact using the reactor current ILa detected by the current sensor 12a in place of the current Ia.

The power command anomaly processing section 106 functions to set the upper and lower limit values that are determined in consideration of performance variations of hardware components in the power supply system 1 and detection errors of the voltage sensors, current sensors, temperature sensors, and other sensors for detecting data related to power control operation, determine occurrence of a sensor anomaly when the total power PH exceeds the upper or lower limit value, and correct the power command value PH*.

The performance variations of hardware components in the DC power supplies 10a, 10b may include, for example, variations in charge and discharge characteristics among individual power supplies assembled for use as the same DC power supply 10a (or 10b). The detection errors may be error values (or tolerance) previously defined as intrinsic values for each of the sensors used as the current sensors and other sensors.

Figure 22:
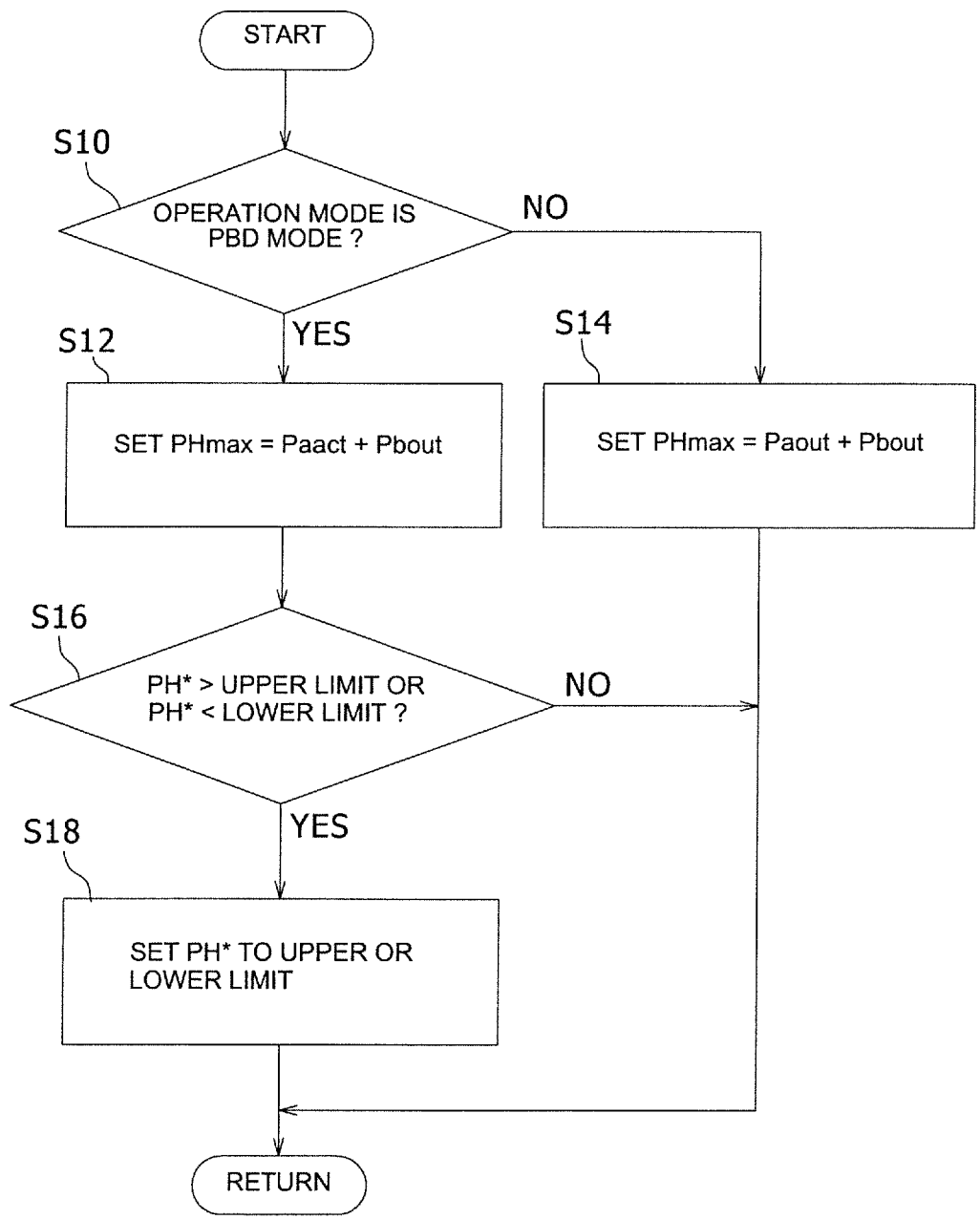
FIG. 22 is a flowchart showing procedural steps in the power limiting process performed by the power managing section of FIG. 21.

FIG. 22 is a flowchart showing steps of the power control process performed in the power managing section 100 configured as illustrated in FIG. 21. The power control process may be executed at predefined time intervals by software or other programs previously stored in a storage section of the controller 40.

Firstly, in step 10, the power managing section 100 determines whether or not the PBD mode is selected as the operation mode of the power converter 50. This step is performed as a capability of the operation mode determining section 102 shown in FIG. 21. When affirmative determination is made in this step, operation moves to step 12, whereas when negative determination is made, operation moves to step 14.

After determining the selection of the PBD mode in step 10 (YES in S10), the power managing section 100 sets, in the subsequent step 12, the maximum value PHmax of the power command value PH* for the total power PH supplied to the power line 20 to the sum of the actual power Paact of the DC power supply 10a and the discharge limiting value Pbout for the DC power supply 10b (PHmax=Paact+Pbout). This step is performed as a capability of the power limit changing section 104 in FIG. 21.

On the other hand, after making negative determination in step 10 (NO in S10), the power managing section 100 sets (or maintains), in the subsequent step 14, the maximum value PHmax of the power command value PH* for the total power PH supplied to the power line 20 at the sum of the discharge limiting values Paout, Pbout of the DC power supplies 10a, 10b (PHmax=Paout+Pbout). This step is performed as a capability of the power limit changing section 104 in FIG. 21.

Figure 24:
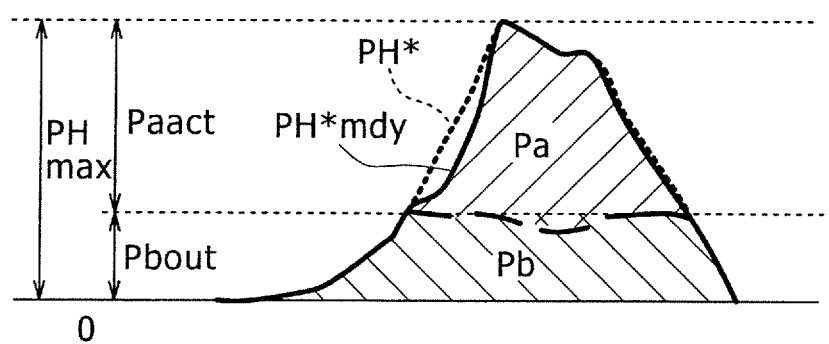
FIG. 24 is a schematic diagram showing the power limiting process executed by the power managing section of FIG. 21.

Processing in step 12 is explained in detail with reference to FIG. 24. The maximum value PHmax of the total power, which is set to the sum of the actual power Paact of the DC power supply 10a and the discharge limiting value Pbout of the DC power supply 10b, has a value that reflects a difference created between the power command value Pa* and the actual power Paact by the delayed response of the power converter 50; i.e., the power command value Pa* from which a shortage of power is subtracted. Then, the power command value PH* for the total power PH delivered from the DC power supplies 10a, 10b is modified to a value PH*mdy which is reduced from the power command value PH* by the shortage of power. This can prevent the power corresponding to the shortage of power from being drawn from the DC power supply 10b directly connected to the electrical power line 20, and in turn keep the output power Pb of the DC power supply 10b from exceeding the discharge limiting value Pbout. In this way, there can be suppressed progress of deterioration of the DC power supply 10b due to an event that the output power Pb exceeds the discharge limiting value Pbout.

It should be noted that when the maximum value PHmax of the total power PH is limited as described above, the operating state (such as a torque, for example) of the load 30 is temporarily restricted as appropriate until responsivity of the power converter 50 is restored to the extent that a power corresponding to the power command value Pa* can be output. In a case of the vehicle equipped with the power supply system 1, a process for temporarily slowing torque changes is preferably performed, to keep drivability from deteriorating as a result of such restriction on the torque as described above.

Referring back to FIG. 22, after performing processing in step 12, the power managing section 100 determines in step 16 whether or not the power command value PH* for the total power PH exceeds the upper or lower limit value. Then, in subsequent step 18, when the power command value PH* is greater than the upper limit value, the upper limit value is defined as the power command value PH*, and when the power command value PH* is lower than the lower limit value, the lower limit value is defined as the power command value PH*. These processes are performed as a capability of the power command anomaly processing section 106.

Figure 23:
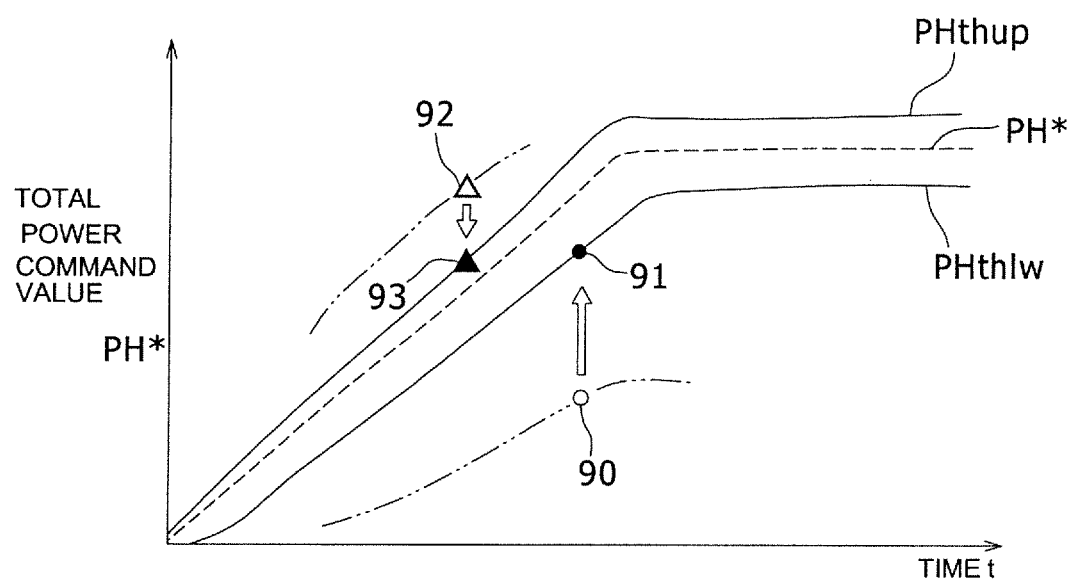
FIG. 23 is a schematic diagram for explaining a function of a power command anomaly processing section shown in FIG. 21.

The processing in steps 16 and 18 is described in detail below. FIG. 23 is a diagram for schematically explaining the capability of the power command anomaly processing section 106 depicted in FIG. 21. In FIG. 23, a graph with time plotted on the abscissa and the power command value PH* for the total power plotted on the ordinate shows an example in which the upper limit value PHthup is depicted above the power command values PH*, and the lower limit value PHthlw is depicted below the power command value PH*.

The upper and lower limit values PHthup and PHthlw of the power command value PH* are determined taking into account the performance variations in hardware components of the power supply system 1, the detection errors (or tolerance) of the voltage, current, and other sensors for acquiring data associated with the power control operation, and the responsivity (time constants) of the power converter 50. In particular, taking the gains related to the power command value PH* as GL and GH (where $0<GL \leq 1.0 \leq GH$), offsets as OL and OH (where $OL \leq 0.0 \leq OH$), and responsivity (time constants) as TL and TH (where $0<TL \leq (median) \leq TH$), the upper and lower limit values PHthup and PHthlw may be calculated by equations (11) and (12) as follows.

$$PHthup = [PH^* \times GH + OH] \text{ smoothened by time constant } TH \quad (11)$$

$$PHthlw = [PH^* \times GL - OL] \text{ smoothened by time constant } TL \quad (12)$$

The gains GL, GH, the offsets OL, OH, and the responsivity (time constants) TL, TH may be statistically determined or determined by design under the assumption that the power supply system 1 operates without failure.

In step 16 of FIG. 22, the upper and lower limit values PHthup and PHthlw calculated by equations (11) and (12) are compared with the power command value PH* for the total power PH. Then, as indicated by a hollow circle 90 in FIG. 23, the power command value PH* that is lower than the lower limit value PHthlw is corrected to the lower limit value indicated by a solid circle 91 (PH*=PHthlw) in step 18. Or, the power command value PH* that is greater than the upper limit value PHthup indicated by a hollow triangle 92 in FIG. 23 is corrected to the upper limit value indicated by a solid triangle 93 (PH*=PHthup) in step 18.

Such correction for the power command value PH* as described above can function to prevent the operating state of the load 30 from undergoing abrupt changes even when an abnormal value is assigned to the power command value PH*, for example, due to sensor malfunction or other failures. In this way, it becomes possible for the vehicle equipped with the power supply system 1 to initiate an appropriate action (for example, a fail-safe mode) while avoiding sudden deceleration, acceleration, and the like due to sensor malfunction or other failures.

Referring back to FIG. 22, after processing in step 18 is performed or when negative determination is made in step 16 (i.e.; $PHthlw \leq PH^* \leq PHthup$), the power control operation is finished.

As described above, when the PBD mode is selected, overdischarge of the DC power supply 10b directly connected to the power line 20 can be appropriately prevented in the power supply system 1 of this embodiment by setting the maximum value PHmax of the power command value PH* for the total power PH to the sum of the actual power Paact of the DC power supply 10a and the discharge limiting value Pbout of the DC power supply 10b. As a result, progression of deterioration in the DC power supply 10b can be accordingly reduced.

According to the present embodiment, when any operation mode other than the PBD mode is selected, the maximum value PHmax of the power command value PH* for the total power PH is set or maintained at the sum of the discharge limiting values Paout, Pbout of the DC power supplies 10a, 10b. In this way, the power available from the DC power supplies 10a, 10b can be maximized within the limited range. This allows the power supply system 1 mounted on a hybrid vehicle, for example, to suitably output the power required when the engine is cranked, which can, in turn, improve startability of the engine in the hybrid vehicle.

Further, according to this embodiment, the upper and lower limit values PHthup and PHthlw defined in light of the performance variations in the hardware components of the power supply system 1, the detection errors, and other factors are given to the power command value PH* of the total power PH. This can ensure that sudden changes in the operating states of the power supply system 1 are prevented from occurring due to sensor malfunction or other failures.

It is to be understood that the present invention is not limited to the components of the embodiment and modifications set forth above, and may be variously changed or improved without departing from the scope of the claims of the present application and of equivalents of this invention.

For example, the power supply system 1, which has been described with the two DC power supplies 10a and 10b that are changeably connected in parallel or in series to the power line 20 by controlling the ON or OFF states of the switching elements S1 to S4, is not limited to the described structure. Instead, the present invention may be applied to a power supply system 1A in which, as shown in FIG. 25, independently controllable power converters 50a and 50b are respectively associated with the DC power supplies 10a and 10b, and the DC power supplies 10a, 10b are parallelly connected through the power converters 50a, 50b to the power line 20.

Figure 25:
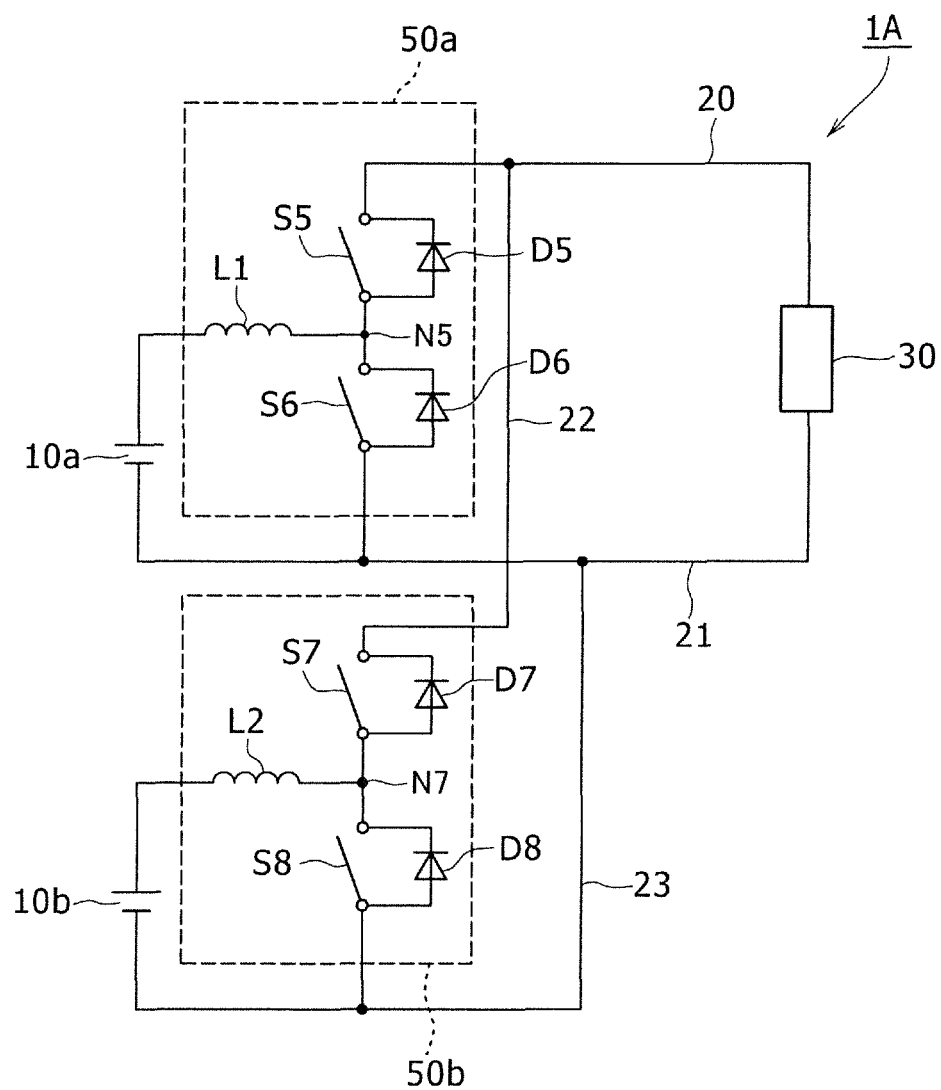
FIG. 25 is a diagram showing another exemplary configuration of the power supply system.

As shown in FIG. 25, the power converter 50a for the DC power supply 10a includes the reactor L1 connected on its one end to the positive terminal of the DC power supply 10a, a switching element S5 connected as the upper arm element between a node N5 connected to the other end of the reactor L1 and the power line 20, and a switching element S6 connected as the lower arm element between the node N5 and the grounding line 21. The switching elements S5 and S6 are antiparallelly connected to diodes D5 and D6, respectively.

On the other hand, the power converter 50b for the DC power supply 10b includes the reactor L2 connected on its one end to the positive terminal of the DC power supply 10b, a switching element S7 connected as the upper arm element between a node N7 connected to the other end of the reactor L2 and the power line 22, and a switching element S8 connected as the lower arm element between the node N7 and a grounding line 23. The switching elements S7 and S8 are antiparallelly connected to diodes D7 and D8, respectively, and a power line 22 is connected to the power line 20 on a DC power supply 10a side, while the grounding line 23 is connected to the grounding line 21 on the DC power supply 10a side. The other components in the power supply system 1A are identical to those described in the embodiment.

In the power supply system 1A shown in FIG. 25, the DC power supplies 10a, 10b cannot be switched to the serially connected condition. Therefore, the SB and SD modes among the operation modes shown in FIG. 3 according to the above-described embodiment cannot be used, while the other operation modes may be employed to perform the power converter control as in the case of the above-described embodiment. In particular, the PBD mode may be performed by fixing the switching element S7 in the power converter 50b to the ON state while performing DC/DC conversion in the power converter 50a.

Alternatively, the power converter 50b may be omitted from the power supply system 1A, and the DC power supply 10b may be directly connected to both the power line 20 and the grounding line 21. Also in this case, the PBD mode may be performed in a manner similar to that performed by the power supply system 1.

REFERENCE NUMERALS 1, 1A POWER SUPPLY SYSTEM, 10a, 10b DC POWER SUPPLY, 11a, 11b VOLTAGE SENSOR, 12a, 12b CURRENT SENSOR, 20, 22 POWER LINE, 21, 23 GROUNDING LINE, 30 LOAD, 32 INVERTER, 35 MOTOR GENERATOR, 36 POWER TRANSMISSION GEAR, 37 DRIVE WHEEL, 40 CONTROLLER, 50, 50a, 50b POWER CONVERTER, 80-89 CURRENT PATH, 100 POWER MANAGING SECTION, 102 OPERATION MODE DETERMINING SECTION, 104 POWER LIMIT CHANGING SECTION, 106 POWER COMMAND ANOMALY PROCESSING SECTION, 200 POWER CONTROLLING SECTION, 210 DEVIATION COMPUTING SECTION, 220 CONTROL COMPUTING SECTION, 230 FIRST LIMITER, 240 POWER ALLOCATING SECTION, 250 CIRCULATING POWER ADDING SECTION, 260 SECOND LIMITER, 270 SUBTRACTING SECTION, 300, 310 CURRENT CONTROLLING SECTION, 302, 312 CURRENT COMMAND GENERATING SECTION, 304, 314 DEVIATION COMPUTING SECTION, 306, 316 CONTROL COMPUTING SECTION, 308, 318 ADDING SECTION, 400 PWM CONTROLLING SECTION, 410 CARRIER WAVE GENERATING SECTION, CH SMOOTHING CAPACITOR, D1-D8 DIODE, Ia, Ib, ILa, ILb CURRENT, Ia*, Ib* CURRENT COMMAND VALUE, k POWER ALLOCATION RATIO, L1, L2 REACTOR, N1, N2, N3, N5, N7 NODE, Pa, Pb OUTPUT POWER, Pa*, Pb* POWER COMMAND VALUE, Paact ACTUAL POWER, Pain, Pbin CHARGE LIMITING VALUE, Paout, Pbout DISCHARGE LIMITING VALUE, Par POWER, PH, PHr TOTAL POWER, PH* TOTAL POWER COMMAND VALUE, PHmax POWER UPPER LIMIT VALUE/MAXIMUM VALUE, PHmin POWER LOWER LIMIT VALUE, PHr TOTAL POWER, PHthlw LOWER LIMIT VALUE, PHthup UPPER LIMIT VALUE, Pr CIRCULATING POWER/CIRCULATING POWER VALUE, Ra, Rb INTERNAL RESISTANCE, S1-S8 SWITCHING ELEMENT, SDa, SDb, SDc CONTROL PULSE SIGNAL, SG1-SG4 CONTROL SIGNAL, Ta, Tb TEMPERATURE, Va, Vb VOLTAGE, VH OUTPUT POWER, VH* VOLTAGE COMMAND VALUE, VHmax UPPER LIMIT VOLTAGE, VHrq LOAD REQUEST VOLTAGE, VR1-VR3 VOLTAGE RANGE, ΔVH VOLTAGE DEVIATION.

What is claimed is:

1. A power supply system comprising:
a load;
a power line connected to the load;
first and second DC power supplies capable of supplying power to the load;
a power converter connected between the power line and at least one of the first and second DC power supplies, and
a controller for controlling operation of the power converter, wherein;
the power converter comprises a plurality of switching elements, and is operated in one of a plurality of operation modes which differ from each other in a way of converting power between the power line and the first and second DC power supplies;
upon selection, from among the plurality of operation modes, of one operation mode in which the first and second DC power supplies are parallelly connected to the power line to provide an output of the first DC power supply to the power line after the output is converted into a DC voltage by the power converter, and provide an output of the second DC power supply to the power line without performing DC voltage conversion, the controller sets a maximum value of a total power output from the first and second DC power supplies to the power line to the sum of an actual power of the first DC power supply and a discharge limiting value defined for the second DC power supply, wherein the actual power is a product of a detected current value of the first direct current power supply and a detected voltage value of the first direct current power supply, and the discharge limit value is an upper limit value of electric power that can be discharged from the second direction current power supply.

2. The power supply system according to claim 1, wherein:
upper and lower limit values are defined for the total power supplied from the first and second DC power supplies, to perform a process of correcting a power command value given to the total power when the total power exceeds the upper or lower limit value.

3. The power supply system according to claim 1, wherein:
in the selected one operation mode, the plurality of switching elements are switched by on-off control, to thereby perform the DC voltage conversion between the first DC power supply and the power line, and to directly connect the second DC power supply to the power line.

4. The power supply system according to claim 3, wherein:
the second DC power supply is connected to the power line via a current path including predetermined switching elements among the plurality of switching elements, and the second DC power supply is directly connected to the power line by fixing the predetermined switching elements to an ON state in the selected one operation mode.

5. The power supply system according to claim 3, wherein:
a first power converter including a plurality of switching elements is connected between the first DC power supply and the power line,
a second power converter including other plurality of switching elements different from those in the first power converter is connected between the second DC power supply and the power line,
in the selected one operation mode, the plurality of switching elements in the first power converter are switched by on-off control, to thereby perform the DC power conversion between the first DC power supply and the power line, while at least one of the other plurality of switching elements in the second power converter is fixed to an ON state, to thereby directly connect the second DC power supply to the power line.

6. A power supply system comprising:
a load;
a power line connected to the load;
first and second DC power supplies capable of supplying power to the load;
a power converter connected between the power line and at least one of the first and second DC power supplies, and
a controller for controlling operation of the power converter, wherein;
the power converter comprises a plurality of switching elements, and is operated in one of a plurality of operation modes which differ from each other in a way of converting power between the power line and the first and second DC power supplies;
upon selection, from among the plurality of operation modes, of one operation mode in which the first and second DC power supplies are parallelly connected to the power line to provide an output of the first DC power supply to the power line after the output is converted into a DC voltage by the power converter, and provide an output of the second DC power supply to the power line without performing DC voltage conversion, the controller sets a maximum value of a total power output from the first and second DC power supplies to the power line to the sum of an actual power of the first DC power supply and a discharge limiting value defined for the second DC power supply,
wherein upper and lower limit values are defined for the total power supplied from the first and second DC power supplies, to perform a process of correcting a power command value given to the total power when the total power exceeds the upper or lower limit value.

7. A power supply system comprising:
a load;
a power line connected to the load;
first and second DC power supplies capable of supplying power to the load;
a power converter connected between the power line and at least one of the first and second DC power supplies, and
a controller for controlling operation of the power converter, wherein;
the power converter comprises a plurality of switching elements, and is operated in one of a plurality of operation modes which differ from each other in a way of converting power between the power line and the first and second DC power supplies;
upon selection, from among the plurality of operation modes, of one operation mode in which the first and second DC power supplies are parallelly connected to the power line to provide an output of the first DC power supply to the power line after the output is converted into a DC voltage by the power converter, and provide an output of the second DC power supply to the power line without performing DC voltage conversion, the controller sets a maximum value of a total power output from the first and second DC power supplies to the power line to the sum of an actual power of the first DC power supply and a discharge limiting value defined for the second DC power supply,
wherein in the selected one operation mode, the plurality of switching elements are switched by on-off control, to thereby perform the DC voltage conversion between the first DC power supply and the power line, and to directly connect the second DC power supply to the power line.

8. The power supply system according to claim 7, wherein:
the second DC power supply is connected to the power line via a current path including predetermined switching elements among the plurality of switching elements, and the second DC power supply is directly connected to the power line by fixing the predetermined switching elements to an ON state in the selected one operation mode.

9. The power supply system according to claim 7, wherein:
a first power converter including a plurality of switching elements is connected between the first DC power supply and the power line,
a second power converter including other plurality of switching elements different from those in the first power converter is connected between the second DC power supply and the power line, in the selected one operation mode, the plurality of switching elements in the first power converter are switched by on-off control, to thereby perform the DC power conversion between the first DC power supply and the power line, while at least one of the other plurality of switching elements in the second power converter is fixed to an ON state, to thereby directly connect the second DC power supply to the power line.

* * * * *